US008378288B2

(12) United States Patent
Kiyose

(10) Patent No.: US 8,378,288 B2
(45) Date of Patent: Feb. 19, 2013

(54) OPTICAL POSITION DETECTING DEVICE, ROBOT HAND, AND ROBOT ARM

(75) Inventor: Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 153 days.

(21) Appl. No.: 13/078,068

(22) Filed: Apr. 1, 2011

(65) Prior Publication Data
US 2011/0243701 A1 Oct. 6, 2011

(30) Foreign Application Priority Data
Apr. 2, 2010 (JP) .................................. 2010-085818

(51) Int. Cl.
*G06M 7/00* (2006.01)
*H01J 40/14* (2006.01)

(52) U.S. Cl. ........................................ 250/221; 345/173

(58) Field of Classification Search .......... 250/221–224, 250/559.29, 559.33; 345/173, 175, 702
See application file for complete search history.

(56) References Cited

U.S. PATENT DOCUMENTS

| 6,953,926 | B2 | 10/2005 | Reime | |
|---|---|---|---|---|
| 8,035,671 | B2 * | 10/2011 | Evans | 347/188 |
| 2001/0052581 | A1 * | 12/2001 | Bohn | 250/559.38 |
| 2010/0128099 | A1 * | 5/2010 | Evans | 347/171 |

FOREIGN PATENT DOCUMENTS

JP 2003-534554 11/2003

* cited by examiner

*Primary Examiner* — Seung C Sohn
(74) *Attorney, Agent, or Firm* — Harness, Dickey & Pierce, P.L.C.

(57) ABSTRACT

An optical position detecting device includes a plurality of light source sections which emits detection light, a light detection section which receives the detection light reflected by a target object located in an emitting space of the detection light, a light source driving section which turns on some light source sections among the plurality of light source sections in a first period and turns on, in a second period, light source sections different from the light source sections turned on in the first period, and a position detecting section which detects the position of the target object on the basis of a light-receiving result of the light detection section in the first period and the second period. Each of the light source sections includes a plurality of light-emitting elements arrayed in a direction intersecting the direction of the optical axis of the detection light.

13 Claims, 11 Drawing Sheets

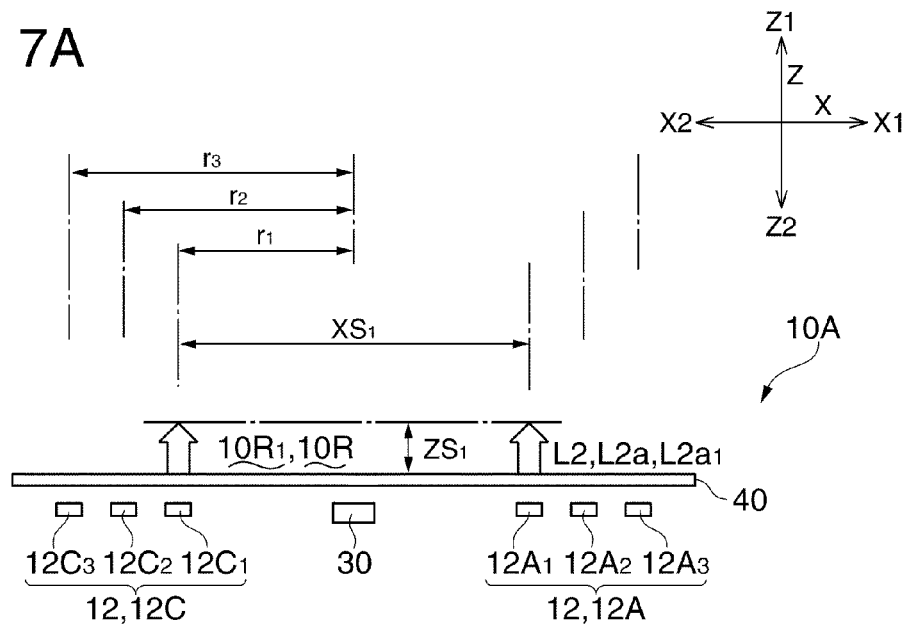
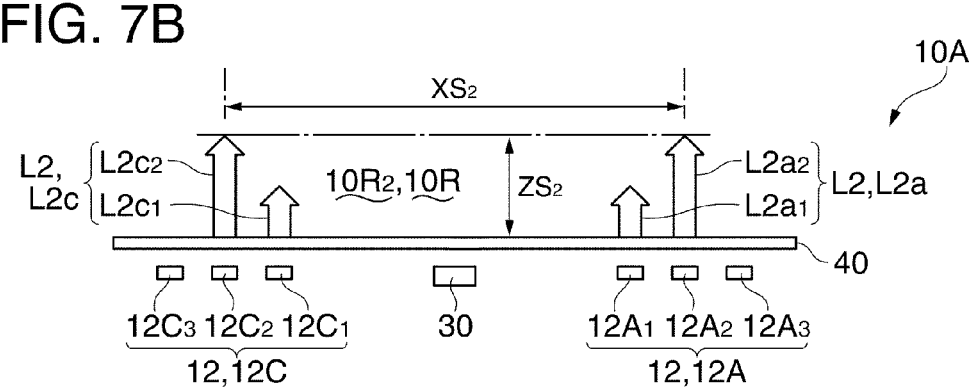
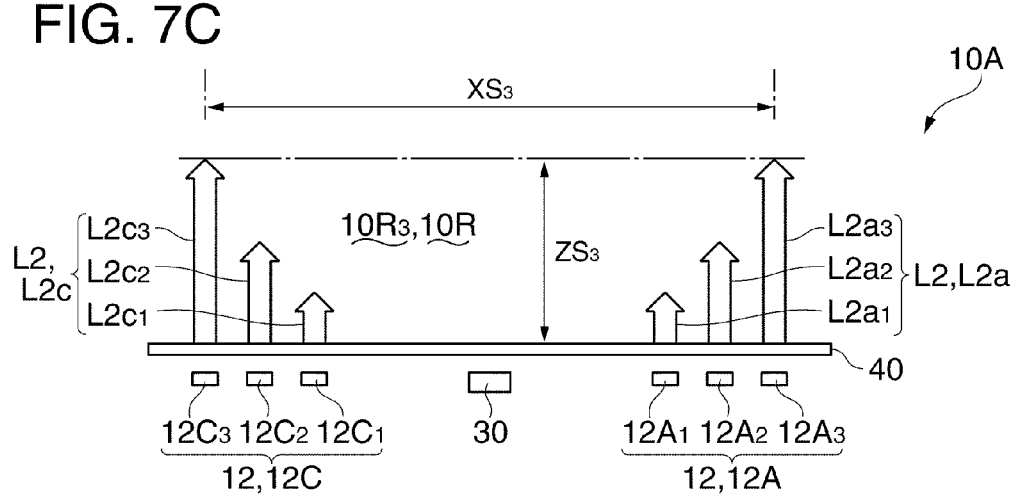

OPTICAL POSITION DETECTING DEVICE, ROBOT HAND, AND ROBOT ARM

This application claims priority to Japanese Patent Application No. 2010-085818 filed Apr. 2, 2010 which is hereby expressly incorporated by reference herein in its entirety.

BACKGROUND

1. Technical Field

The present invention relates to an optical position detecting device which optically detects a target object.

2. Related Art

An optical position detecting device has been suggested for optically detecting a target object, for example, by emitting detection light toward the target object via a translucent member from two detection light source sections, and detection light reflected by the target object is transmitted through the translucent member and is detected by a photodetector. In such an optical position detecting device, for example, if the two detection light source sections are differentially moved on the basis of the detection result in the photodetector, the ratio of the distance between one light source section for detection of the two detection light source sections and the target object and the distance between the other light source section for detection and the target object is known. Accordingly, the position of the target object can be detected (refer to JP-T-2003-534554).

However, in the configuration described in JP-T-2003-534554, the emitting space of the detection light is fixed. Therefore, there are the following problems. First, even in a case where it is known in advance that the target object is present within a narrow range, it is necessary to emit the detection light with an illuminance higher than a predetermined value over a wide range. Therefore, there is a problem in that electric power is wastefully consumed. Additionally, since the emitting space of the detection light is fixed, even in a case where a target object only in a specific space is detected, there is a problem in that a target object within the entire emitting space may be detected.

SUMMARY

An advantage of some aspects of the invention is to provide an optical position detecting device which can make the size of the emitting space of detection light variable.

According to an aspect of the invention, there is provided an optical position detecting device which optically detects the position of a target object. The optical position detecting device includes a plurality of detection light source sections which emit detection light with mutually different optical axes, a photodetector which receives the detection light reflected by a target object located in an emitting space of the detection light, a light source driving section which sequentially turns on the plurality of detection light source sections, and a position detecting section which detects the position of the target object on the basis of a light-receiving result of the photodetector when the plurality of detection light source sections is turned on sequentially. The light source section has a plurality of light-emitting elements whose central optical axes are arranged parallel to each other.

In the aspect of the invention, the light source driving section sequentially turns on the plurality of detection light source sections, and the photodetector receives the detection light reflected by the target object during that time. Accordingly, if a detection result in the photodetector is directly used, or a driving current or the like when the two detection light source sections are differentially moved via the photodetector is used, the position detecting section can detect the position of the target object. The detection light source section includes a plurality of light-emitting elements whose central optical axes are arranged parallel to each other, and can change the size of the emitting space of the detection light depending on how many light-emitting elements are turned on or whether certain light-emitting elements are turned on. For this reason, in a case where the detection space of the target object is set to be wide, for example, the number of light-emitting elements to be turned on can be increased to extend the emitting space, and in a case where the detection space of the target object is set to be narrow, the number of light-emitting elements to be turned on can be reduced, to narrow the emitting space. Accordingly, since the electric power required to turn on the light sources is not wastefully consumed, a reduction in power consumption can be achieved. Additionally, since the emitting space of the detection light is variable, detection of the target object only in a specific narrow space can also be performed.

In the aspect of the invention, the light source driving section executes the first mode where some light-emitting elements of the plurality of light-emitting elements are turned on and the second mode where light-emitting elements that are different from at least those in the first mode among the plurality of light-emitting elements are turned on.

In the aspect of the invention, it is preferable that the light source driving section turns on a number of the light-emitting elements of the plurality of light-emitting elements in the first mode, and simultaneously turns on, in the second mode, the light-emitting elements turned on in the first mode and light-emitting elements different from those in the first mode, thereby extending the emitting space in a direction in which the central optical axes of the light-emitting elements are arrayed. According to this configuration, in the first mode, the number of light-emitting elements to be turned on can be reduced to narrow the emitting space. Thus, a reduction of the electric power consumed to turn on the light sources can be achieved.

In the aspect of the invention, it is possible to adopt a configuration in which the light source driving section turns on one light-emitting element among the plurality of light-emitting elements in the first mode, and simultaneously turns on, in the second mode, two or more light-emitting elements including the light-emitting element turned on in the first mode. According to this configuration, in the first mode, the number of light-emitting elements to be turned on can be reduced to one so as to narrow the emitting space. Thus, a reduction in the electric power consumed to turn on the light sources can be achieved. Additionally, since the emitting space of the detection light can be narrowed to the minimum, the target object only in a specific narrow space can also be detected.

The invention can be applied to a first type optical position detecting device in which the plurality of detection light source sections emits the detection light in the same direction.

In the aspect of the invention, it is possible to adopt a configuration in which, as seen from the emitting space, the photodetector is arranged at a position surrounded by the plurality of detection light source sections, and the plurality of light-emitting elements is linearly arrayed toward a direction separated from a position near the photodetector in the detection light source sections. Light-emitting elements at a position nearer the photodetector than light-emitting elements which are not turned on in the first mode but turned on in the second mode among the plurality of light-emitting elements are turned on in the first mode.

In the aspect of the invention, it is possible to adopt a configuration in which, as seen from the emitting side of the detection light, the central optical axes of the plurality of light-emitting elements in the detection light source sections are linearly arrayed toward the outside from the inside of the emitting space, and light-emitting elements arranged further inside the emitting space than light-emitting elements which are not turned on in the first mode but turned on in the second mode among the plurality of light-emitting elements is turned on in the first mode.

In the aspect of the invention, it is preferable that light-emitting elements in a turned off state in the first mode among the light-emitting elements turned on in the second mode have a larger light-emitting intensity of the detection light than light-emitting elements in a turned on state in the first mode. If such a configuration is adopted, the intensity of the detection light can be brought into a continuous state in the emitting space of the detection light in the first mode and the emitting space of the detection light after being extended in the second mode. Thus, the same detection precision as the first mode can be obtained even in the second mode.

The invention can also be applied to a second type optical position detecting device in which the plurality of detection light source sections includes detection light source sections which emit the detection light in directions opposite to each other on both sides between which the emitting space is interposed.

In the aspect of the invention, even in either the first type or second type optical position detecting device, it is preferable that the position detecting section detects the position of the target object on the basis of a result obtained by differentially moving some detection light source sections and other detection light source sections among the plurality of detection light source sections, on the basis of the light-receiving result of the photodetector. If such a differential movement is used, the influence of environmental light or the like can be automatically corrected.

In the aspect of the invention, it is possible to adopt a configuration in which the optical position detecting device further includes a reference light source which emits reference light which enters the photodetector without travelling through the emitting space. The position detecting section may detect the position of the target object on the basis of a result obtained by changing and differentially moving combinations of some detection light source sections of the plurality of detection light source sections and the reference light source, on the basis of the light-receiving result of the photodetector. If such a differential movement is used, the influence of environmental light or the like can be automatically corrected.

In the aspect of the invention, it is preferable that the detection light is infrared light. According to this configuration, since the detection light is not viewed, the optical position detecting device can be used for various apparatuses without hindering display even in a case where the optical position detecting device is applied to a display apparatus.

BRIEF DESCRIPTION OF THE DRAWINGS

The invention will be described with reference to the accompanying drawings, wherein like numbers reference like elements.

FIGS. 7A to 7C are explanatory views showing that the size of a detection space is switched, in the optical position detecting device related to Embodiment 1 of the invention.

DESCRIPTION OF EXEMPLARY EMBODIMENTS

Figure 1:
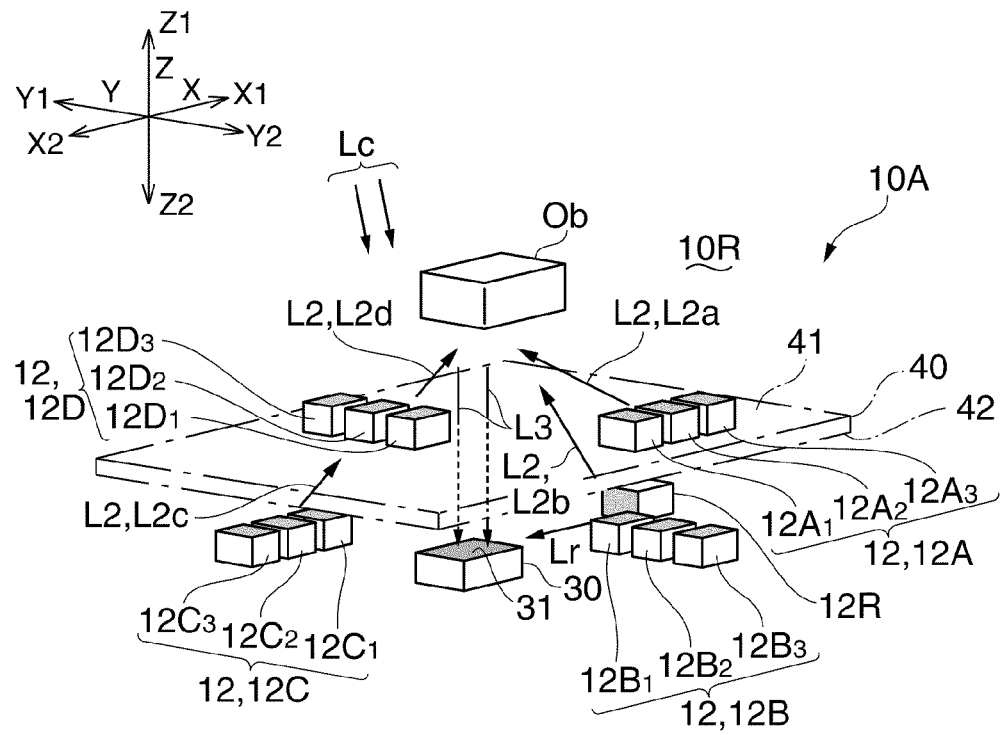
FIG. 1 is an explanatory view showing sections of an optical position detecting device related to Embodiment 1 of the invention.

Next, embodiments of the invention will be described with reference to the accompanying drawings. In addition, in the following description, the axes which intersect each other will be described as the X-axis, the Y-axis, and the Z-axis, and the emission direction of detection light will be described relative to the Z-axis direction. Additionally, in the drawings referred to below, one side of an X-axis direction is shown as the X1 side, the opposite side thereof is shown as the X2 side, one side of a Y-axis direction is shown as the Y1 side, and the opposite side thereof is shown as the Y2 side.

Embodiment 1

Overall Configuration

Figure 2A:
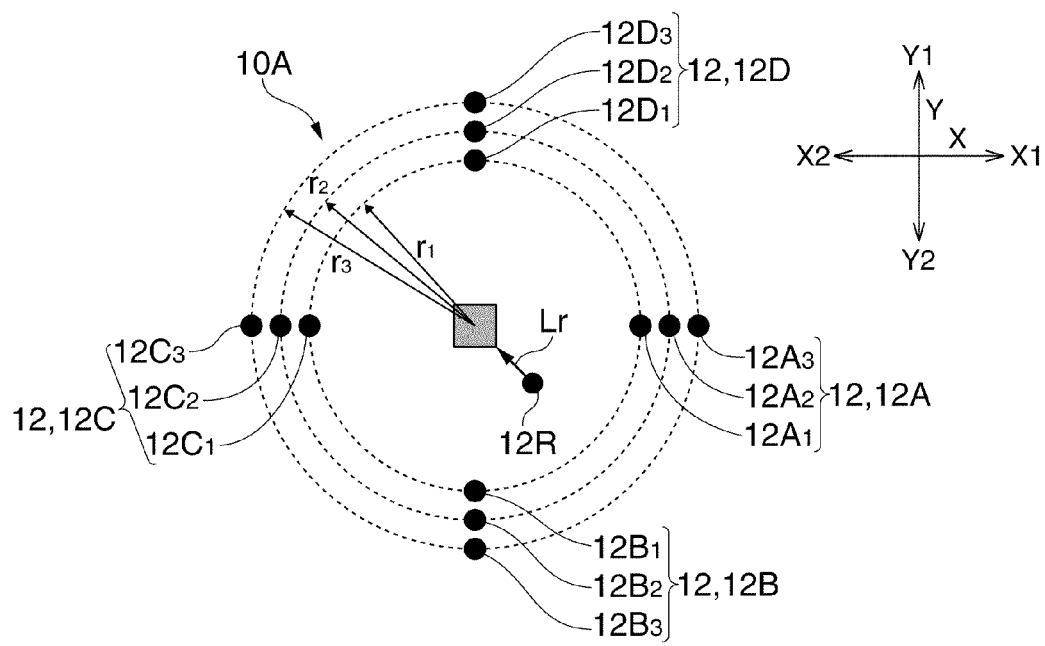
FIGS. 2A and 2B are explanatory views showing the configuration of detection light source sections in the optical position detecting device related to Embodiment 1 of the invention.
Figure 2B:
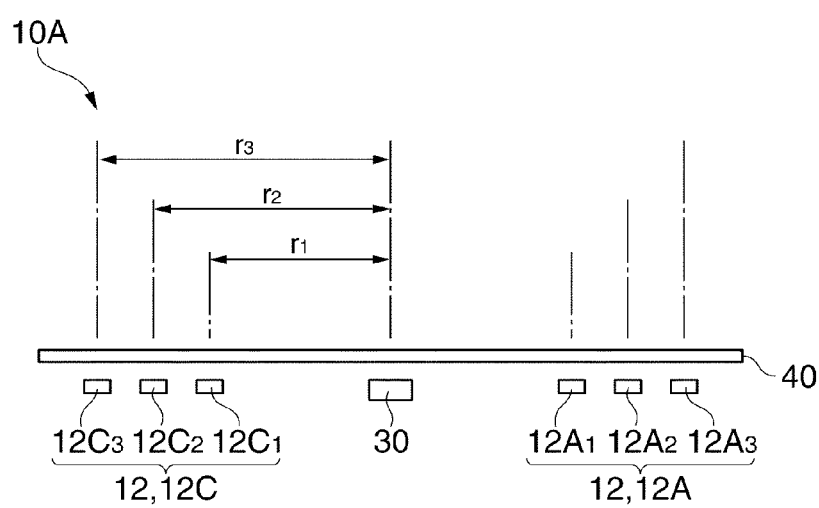
Figure 3:
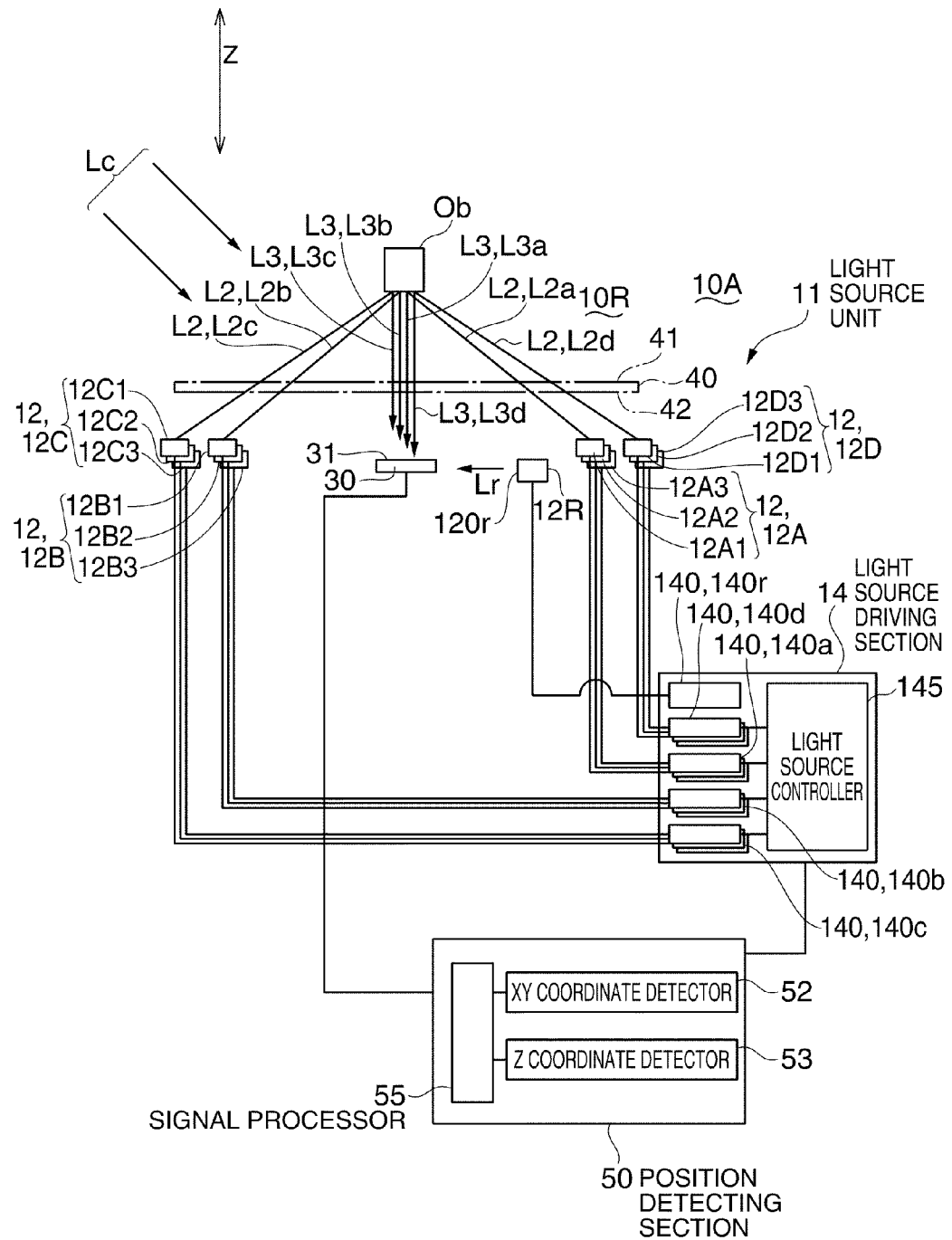
FIG. 3 is an explanatory view showing the overall configuration of the optical position detecting device related to Embodiment 1 of the invention.

FIG. 1 is an explanatory view showing sections of an optical position detecting device related to Embodiment 1 of the invention. FIGS. 2A and 2B is an explanatory view showing the configuration of detection light source sections in the optical position detecting device related to Embodiment 1 of the invention, and FIGS. 2A and 2B are an explanatory view when the detection light source section is seen from an emitting space of detection light, and an explanatory view when the detection light source section is seen from the side. FIG. 3 is an explanatory view showing the overall configuration of the optical position detecting device related to Embodiment 1 of the invention.

In FIG. 1, FIGS. 2A and 2B, and FIG. 3, the optical position detecting device 10A of the present embodiment is an optical device used as a tactile sensor device in a robot hand unit or the like which will be described below, and includes a light source unit 11 including a plurality of detection light source sections 12 which emit detection light L2 toward one side Z1 in the Z-axis direction, and a photodetector 30 which detects detection light L3 reflected by a target object Ob. Additionally, the optical position detecting device 10A may have a sheet-shaped or plate-shaped translucent member 40. In this case, the detection light source sections 12 emit the detection light L2 toward a first surface 41 from a second surface 42 side opposite to the first surface 41 side in the translucent member 40, and the photodetector 30 detects the detection light L3 which has been reflected by the target object Ob and has been transmitted through the second surface 42 side of the translucent member 40. For this reason, a light-receiving portion 31 of the photodetector 30 faces the second surface 42 of the translucent member 40.

In the present embodiment, the light source unit 11 includes a first detection light source section 12A, a second detection light source section 12B, a third detection light source section 12C, and a fourth detection light source section 12D as a plurality of detection light source sections 12, and these detection light source sections 12 all have light-emitting portions which are directed at the translucent member 40. Accordingly, the detection light L2 emitted from the detection light source sections 12 is transmitted through the translucent member 40 and is emitted to the first surface 41 side (emitting space of the detection light L2 from the light source unit 11). In the present embodiment, a detection space 10R where the position of the target object Ob is detected is constituted by this emitting space (space on the side of the first surface 41).

The first detection light source section 12A to the fourth detection light source section 12D are arranged in this order around the central optical axis of the photodetector 30 as seen from the detection space 10R (Z-axis direction), and the photodetector 30 is located inside the region surrounded by the plurality of detection light source sections 12. In the plurality of detection light source sections 12, the first detection light source section 12A and the third detection light source section 12C are separated from each other in the X-axis direction, and the second detection light source section 12B and the fourth detection light source section 12D are separated from each other in the Y-axis direction. In addition, the second detection light source section 12B and the fourth detection light source section 12D are also separated from each other in the X-axis direction with respect to the first detection light source section 12A as seen from the first detection light source section 12A, and the second detection light source section 12B and the fourth detection light source section 12D are also separated from each other in the X-axis direction with respect to the third detection light source section 12C as seen from the third detection light source section 12C. Similarly, the first detection light source section 12A and the third detection light source section 12C are also separated from each other in the Y-axis direction with respect to the second detection light source section 12B as seen from the second detection light source section 12B, and the first detection light source section 12A and the third detection light source section 12C are also separated from each other in the Y-axis direction with respect to the fourth detection light source section 12D as seen from the fourth detection light source section 12D.

Additionally, as seen from the detection space 10R (Z-axis direction), the first detection light source section 12A to the fourth detection light source section 12D are arranged at equal angular intervals about the photodetector 30. Additionally, as seen from the detection space 10R (Z-axis direction), the first detection light source section 12A to the fourth detection light source section 12D have the same distance from the photodetector 30.

The light source unit 11 also includes a reference light source 12R in which a light-emitting portion is directed to the photodetector 30. The reference light source 12R is constituted by an LED (Light Emitting Diode) or the like, and the reference light source 12R emits reference light Lr of infrared light whose peak wavelength is located within a range of 840 to 1000 nm as divergence light. Here, the reference light Lr emitted from the reference light source 12R does not enter the first surface 41 side (detection space 10R) of the translucent member 40, but enters the photodetector 30, without travelling through the detection space 10R, by the orientation of the reference light source 12R, a light-shielding cover (not shown) provided in the reference light source 12R, or the like.

The photodetector 30 is a photodiode, a photo transistor, or the like in which the light-receiving portion 31 is directed to the translucent member 40. In the present embodiment, the photodetector 30 is a photodiode including a sensitivity peak in the infrared region.

Detailed Configuration of the Detection Light Source Section 12

In the optical position detecting device 10A of the present embodiment, as seen from the detection space 10R (Z-axis direction), each of the plurality of detection light source sections 12 includes a plurality of light-emitting elements lined up in the radial direction. In the present embodiment, the detection light source section 12 includes three light-emitting elements. More specifically, the first detection light source section 12A includes a first innermost light-emitting element $12A_1$, a second light-emitting element $12A_2$ located outside the first light-emitting element $12A_1$ on the side opposite to the side where the photodetector 30 is located, and a third light-emitting element $12A_3$ located outside the second light-emitting element $12A_2$ on the side opposite to the side where the photodetector 30 is located, and the first light-emitting element $12A_1$ to the third light-emitting element $12A_3$ and the photodetector 30 are arranged on the same straight line. Additionally, the central optical axes of the first light-emitting element $12A_1$ to the third light-emitting element $12A_3$ are arranged parallel to each other. In the present embodiment, the central optical axes of the first light-emitting element $12A_1$ to the third light-emitting element $12A_3$ are parallel to each other.

Similarly the second detection light source section 12B includes a first innermost light-emitting element $12B_1$, a second light-emitting element $12B_2$ located outside the first light-emitting element $12B_1$ on the side opposite to the side where the photodetector 30 is located, and a third light-emitting element $12B_3$ located outside the second light-emitting element $12B_2$ on the side opposite to the side where the photodetector 30 is located, and the first light-emitting element $12B_1$ to the third light-emitting element $12B_3$ and the photodetector 30 are arranged on the same straight line. Additionally, the central optical axes of the first light-emitting element $12B_1$ to the third light-emitting element $12B_3$ are arranged parallel to each other. In the present embodiment, the central optical axes of the first light-emitting element $12B_1$ to the third light-emitting element $12B_3$ are parallel to each other.

The third detection light source section 12C includes a first innermost light-emitting element $12C_1$, a second light-emitting element $12C_2$ located outside the first light-emitting element $12C_1$ on the side opposite to the side where the photodetector 30 is located, and a third light-emitting element $12C_3$ located outside the second light-emitting element $12C_2$ on the side opposite to the side where the photodetector 30, and the first light-emitting element $12C_1$ to the third light-emitting element $12C_3$ and the photodetector 30 are arranged on the same straight line. Additionally, the central optical axes of the first light-emitting element $12C_1$ to the third light-emitting element $12C_3$ are arranged parallel to each other. In the present embodiment, the central optical axes of the first light-emitting element $12C_1$ to the third light-emitting element $12C_3$ are parallel to each other.

The fourth detection light source section 12D includes a first innermost light-emitting element $12D_1$, a second light-emitting element $12D_2$ located outside the first light-emitting element $12D_1$ on the side opposite to the side where the photodetector 30 is located, and a third light-emitting element $12D_3$ located outside the second light-emitting element $12D_2$ on the side opposite to the side where the photodetector 30 is located, and the first light-emitting element $12D_1$ to the third light-emitting element $12D_3$ and the photodetector 30 are arranged on the same straight line. Additionally, the central optical axes of the first light-emitting element $12D_1$ to the third light-emitting element $12D_3$ are arranged parallel to each other. In the present embodiment, the central optical axes of the first light-emitting element $12D_1$ to the third light-emitting element $12D_3$ are parallel to each other.

Here, the first light-emitting elements $12A_1$ to $12D_1$ are all located on the circumference of a radius $r_1$ with the photodetector 30 as a center, the second light-emitting elements $12A_2$ to $12D_2$ are all located on the circumference of a radius $r_2$ (here, $r_1 < r_2$) with the photodetector 30 as a center, and the third light-emitting elements $12A_3$ to $12D_3$ are all located on the circumference of a radius $r_3$ (here, $r_2 < r_3$) with the photodetector 30 as a center. For this reason, the first light-emitting elements $12A_1$, $12B_1$, $12C_1$, and $12D_1$, the second light-emitting elements $12A_2$, $12B_2$, $12C_2$, and $12D_2$ and the third light-emitting elements $12A_3$, $12B_3$, and $12C_3$, and $12D_3$ have central optical axes directed from the inside of the detection space 10R to the outside thereof in this order.

All the first light-emitting elements $12A_1$ to $12D_1$, the second light-emitting elements $12A_2$ to $12D_2$, and the third light-emitting elements $12A_3$ to $12D_3$ are respectively constituted by light-emitting elements, such as LEDs (light emission diodes), and emit the detection light L2 (detection light L2a to L2d) of infrared light whose peak wavelength is located within a range of 840 to 1000 nm as divergence light.

Configuration of the Position Detecting Section

As shown in FIG. 3, the light source unit 11 includes a light source driving section 14 which drives the plurality of detection light source sections 12. The light source driving section 14 includes a light source driving circuit 140 which drives the detection light source section 12 and the reference light source 12R, and a light source controller 145 which controls the on/off pattern of each of the plurality of reference light source sections 12R and the detection light source sections 12 via the light source driving circuit 140. The light source driving circuit 140 includes light source driving circuits 140a to 140d which drive the first detection light source section 12A to the fourth detection light source section 12D, and a light source driving circuit 140r which drives the reference light source 12R. Additionally, the light source driving circuits 140a to 140d individually drive the first light-emitting elements $12A_1$ to $12D_1$, the second light-emitting elements $12A_2$ to $12D_2$, and the third light-emitting elements $12A_3$ to $12D_3$, respectively. The light source controller 145 controls all of the light source driving circuits 140a to 140d, and 140r.

In addition, as for the light source driving circuits 140a to 140d, a configuration in which the plurality of detection light source sections 12 is driven by a common light source driving circuit 140 by switching circuits may be adopted.

The position detecting section 50 is electrically connected to the photodetector 30, and a detection result in the photodetector 30 is output to the position detecting section 50. The position detecting section 50 includes a signal processor 55 for detecting the position of the target object Ob on the basis of the detection result in the photodetector 30, and this signal processor 55 includes an amplifier, a comparator, or the like. Additionally, the position detecting section 50 includes XY coordinate detector 52 which detects the XY coordinates of the target object Ob, and the Z coordinate detector 53 which detects the Z coordinate of the target object Ob. The position detecting section 50 and the light source driving section 14 which are configured in this way operate to interlock with each other, and perform the position detection which will be described below.

Basic Detection Principle of Coordinates

Figure 4A:
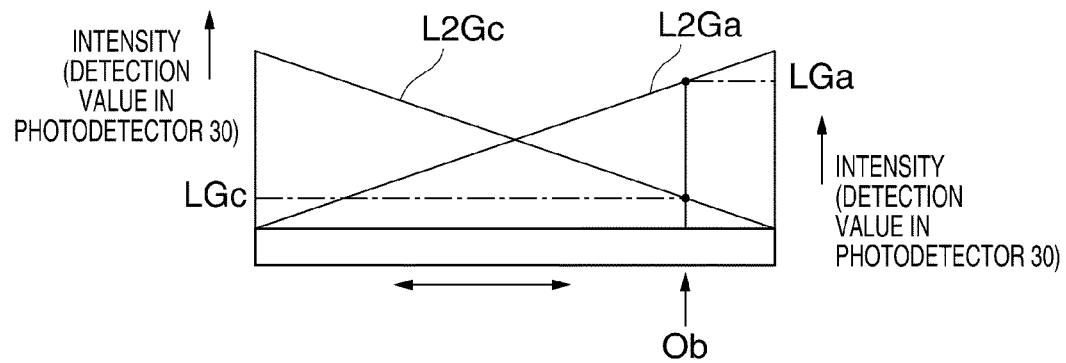
FIGS. 4A and 4B are explanatory views showing that the position of a target object is detected using the differential movement between detection light beams, in the optical position detecting device related to Embodiment 1 of the invention.
Figure 4B:
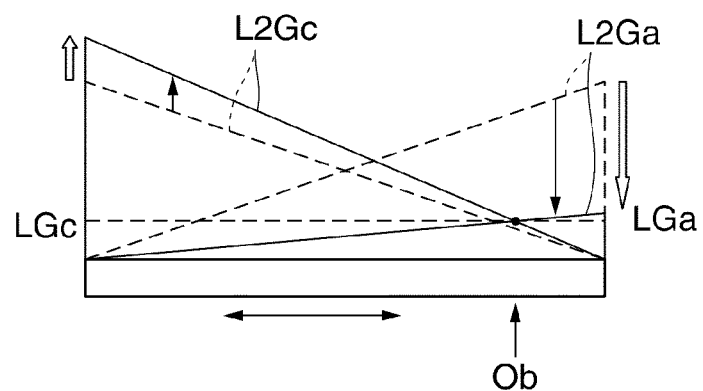

FIGS. 4A and 4B are explanatory views showing the basic principle of coordinate detection used in the optical position detecting device 10A related to Embodiment 1. FIGS. 4A and 4B are an explanatory view showing the relationship between the position of the target object Ob and the light-receiving intensity in the photodetector 30, and an explanatory view showing that the light-emitting intensity of the detection light L2 is adjusted so that the light-receiving intensities in the photodetector 30 become equal to each other.

In the optical position detecting device 10A of the present embodiment, as will be described below with reference to FIGS. 4A to 5B, the ratio of the distance between one detection light source section 12 of the two detection light source sections 12 and the target object Ob and the distance between another detection light source section 12 and the target object Ob is obtained by the differential movement between the detection light source sections 12 or the differential movement between the detection light source section 12 and the reference light source 12R, and the position of the target object Ob is detected on the basis of this ratio. Some or all of the first light-emitting elements $12A_1$ to $12D_1$, the second light-emitting elements $12A_2$ to $12D_2$, and the third light-emitting elements $12A_3$ to $12D_3$ are used during this differential movement. In that case, driving currents in the first detection light source section 12A, the second detection light source section 12B, the third detection light source section 12C, and the fourth detection light source section 12D are respectively the total value of driving currents of the first light-emitting element $12A_1$ to the third light-emitting element $12A_3$, the total value of driving currents of the first light-emitting element $12B_1$ to the third light-emitting element $12B_3$, the total value of driving currents of the first light-emitting element $12C_1$ to the third light-emitting element $12C_3$, and the total value of driving currents of the first light-emitting element $12D_1$ to the third light-emitting element $12D_3$.

Hereinafter, the basic principle will be described when the X coordinate and Y coordinate of the target object Ob are detected from a plurality of results obtained by changing and differentially moving combinations of two light sources for detection among the first detection light source section 12A, the second detection light source section 12B, the third detection light source section 12C, and the fourth detection light source section 12D on the basis of the light-receiving result of the photodetector 30.

In the optical position detecting device 10A of the present embodiment, the detection space 10R is set on a first face 41 side (space on the emitting side of the detection light L2 from the light source unit 11) of the translucent member 40. Additionally, two light source sections 12 for detection, for example, the first detection light source section 12A and the third detection light source section 12C, are separated from each other in the X-axis direction and Y-axis direction. For this reason, when the first detection light source section 12A is turned on and the detection light L2a is emitted, the detection light L2a, as shown in FIG. 4A, forms a first light intensity distribution L2Ga in which intensity decreases monotonously from one side toward the other side. Additionally, when the third detection light source section 12C is turned on and detection light L2c is emitted, the detection light L2c is transmitted through the translucent member 40, and forms a second light intensity distribution L2Gc in which intensity increases monotonously on the first surface 41 side (detection space 10R) from one side toward the other side.

In order to obtain the positional information on the target object Ob using the differential movement between such detection light L2a and L2c, first, as shown in FIG. 4A, the first detection light source section 12A is turned on, the third detection light source section 12C is turned off, and the first light intensity distribution L2Ga in which intensity decreases monotonously from one side toward the other side is formed. Additionally, the first detection light source section 12A is turned off, the third detection light source section 12C is turned on, and the second light intensity distribution L2Gc in which intensity increases monotonously from one side toward the other side is formed. Accordingly, when the target object Ob is arranged in the detection space 10R, the detection light L2 is reflected by the target object Ob, and a portion of the reflected light is detected by the photodetector 30. In that case, the reflection intensity in the target object Ob is proportional to the intensity of the detection light L2 at a place where the target object Ob is located, and the light-receiving intensity in the photodetector 30 is proportional to the reflection intensity in the target object Ob. Accordingly, the light-receiving intensity in the photodetector 30 has a value corresponding to the position of the target object Ob. Therefore, as shown in FIG. 4B, if the ratio of a driving current when the controlled variable (driving current) for the first detection light source section 12A is adjusted and a driving current when the controlled variable (driving current) for the third detection light source section 12C is adjusted, the ratio of the amounts of adjustment, or the like is used so that a detection value LGa in the photodetector 30 when the first light intensity distribution L2Ga is formed and a detection value LGc in the photodetector 30 when the second light intensity distribution L2Gc is formed become equal, whether the target object Ob is present at any position between the first detection light source section 12A and the third detection light source section 12C within the XY plane can be detected.

More specifically, as shown in FIG. 4A, the first light intensity distribution L2Ga and the second light intensity distribution L2Gc are formed so that the light intensity distributions become opposite directions to each other. In this state, it can be seen that, if the detection values LGa and LGc in the photodetector 30 are equal to each other, the target object Ob is located at the center between the first detection light source section 12A and the third detection light source section 12C within the XY plane. On the other hand, in a case where the detection values LGa and LGc in the photodetector 30 are different from each other, as shown in FIG. 4B, the first light intensity distribution L2Ga and the second light intensity distribution L2Gc are sequentially formed again by adjusting the controlled variable (driving current) for the first detection light source section 12A and the third detection light source section 12C so that the detection values LGa and LGc become equal to each other. As a result, if the detection values LGa and LGc in the photodetector 30 become equal to each other, and the ratio of a driving current for the first detection light source section 12A and a driving current for the third detection light source section 12C at that time is used, whether the target object Ob is present at any position between the first detection light source section 12A and the third detection light source section 12C within the XY plane can be detected.

This detection principle is mathematically described using an optical path function, as follows. First, in the above differential movement, when the driving current for the first detection light source section 12A when the light-receiving intensities in the photodetector 30 become equal to each other is defined as $I_A$, the driving current for the third detection light source section 12C is defined as $I_C$, and the ratio of a distance function which leads to the photodetector 30 via the target object Ob from the first detection light source section 12A and a distance function which leads to the photodetector 30 via the target object Ob from the third detection light source section 12C is defined as $P_{AC}$, the ratio $P_{AC}$ is basically obtained according to the following expression.

$$P_{AC}=I_C/I_A$$

Accordingly, it can be seen that the target object Ob is located on an equal ratio line passing through a position obtained by dividing a line which connects the first detection light source section 12A and the third detection light source section 12C by a predetermined ratio.

This model will be mathematically described. First, respective parameters are defined as follows.

T=Reflectivity of target object Ob $A_t$=Distance function when detection light L2 emitted from first detection light source section 12A is reflected by target object Ob and reaches photodetector 30

A=Detection intensity of photodetector 30 when first detection light source section 12A is turned on in a state where target object Ob is present in detection space 10R $C_t$=Distance function when detection light L2 emitted from third detection light source section 12C is reflected by target object Ob and reaches photodetector 30

C=Detection intensity of photodetector 30 when third detection light source section 12C is turned on in a state where target object Ob is present in detection space 10R In addition, although the emission intensity of the first detection light source section 12A and the emission intensity of the third detection light source section 12C are expressed by the product of a driving current and an emission coefficient, the emission coefficient is set to 1 in the following description.

Additionally, when the above-mentioned differential movement is performed in a state where the target object Ob is present in the detection space 10R, the following relationships are obtained.

$$A=T \times A_t \times I_A + \text{Environmental light} \quad (1)$$

$$C=T \times C_t \times I_C + \text{Environmental light} \quad (2)$$

Here, since the detection intensity of the photodetector 30 is equal during differential movement, the following expressions are derived from Expressions (1) and (2).

$$T \times A_t \times I_A + \text{Environmental light} = T \times C_t \times I_C + \text{Environmental light } T \times A_t \times I_A = T \times C_t \times I_C \quad \text{Expression (3)}$$

Additionally, since the ratio $P_{AC}$ of the distance functions $A_t$ and $C_t$ is defined by the following expression:

$$P_{AC}=A_t/C_t \quad (4),$$

the ratio of the distance function $P_{AC}$ is expressed by Expressions (3) and (4):

$$P_{AC}=I_C/I_A \quad (5).$$

In this Expression (5), the item of the environmental light and the reflectivity of the target object Ob are not present. Therefore, the environmental light and the reflectivity of the target object Ob do not influence the ratio $P_{AC}$ of the optical path coefficients $A_t$ and $C_t$. In addition, the correction for offsetting the influence or the like of the detection light L2 which has been incident without being reflected by the target object Ob may be performed on the above mathematical model.

Here, a light source used in the detection light source section 12 is a point light source, and the light intensity thereof at a certain point is inversely proportional to the square of a distance from the light source. Accordingly, the ratio of the separation distance P1 between the first detection light source section 12A and the target object Ob and the separation distance P2 between the third detection light source section 12C and the target object Ob is obtained according to the following expression.

$$P_{AC}=(P1)^2:(P2)^2$$

Therefore, it can be seen that the target object Ob position is located on an equal ratio line passing through a position obtained by dividing an imaginary line which connects the first detection light source section 12A and the third detection light source section 12C in P1:P2.

Similarly, if the second detection light source section 12B and the fourth detection light source section 12D are differentially moved and the ratio of the distance between the second detection light source section 12B and the target object Ob and the distance between the fourth detection light source section 12D and the target object Ob is obtained, it can be seen that the target object Ob is present on an equal ratio line passing through a position which divides an imaginary line which connects the second detection light source section 12B and the fourth detection light source section 12D by a predetermined ratio. Therefore, the X coordinate and Y coordinate of the target object Ob can be detected. In addition, the above method is a method of geometrically describing the principle adopted in the present embodiment. In practice, the calculation is performed using the obtained data. Differential movement between the reference light Lr and the detection light L2

Figure 5A:
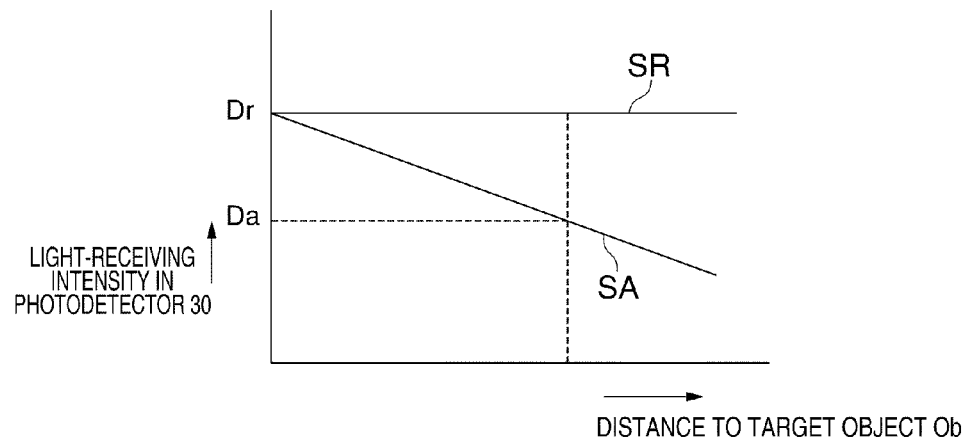
FIGS. 5A and 5B are explanatory views showing that the position of a target object is detected using the differential movement between reference light and detection light, in the optical position detecting device related to Embodiment 1 of the invention.
Figure 5B:
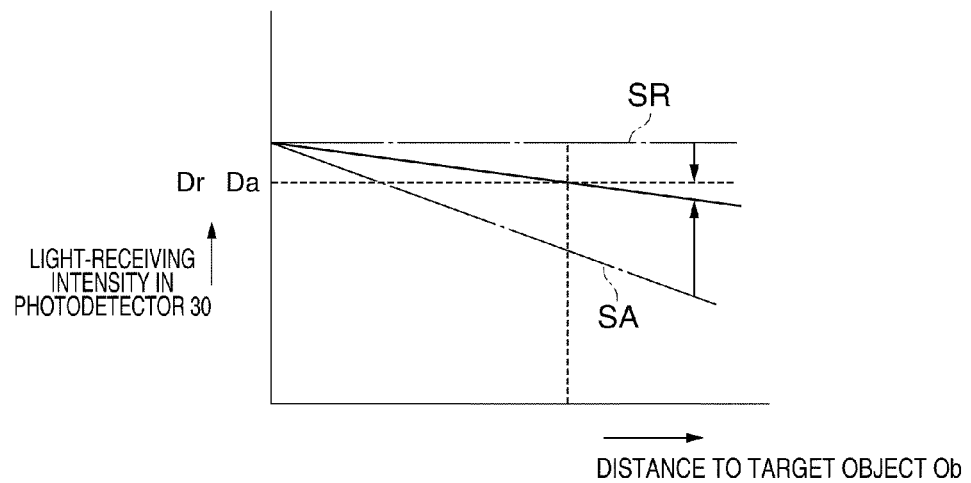

FIGS. 5A and 5B are explanatory views showing a principle that the position of a target object Ob is detected using the differential movement between the reference light Lr and the detection light L2, in the optical position detecting device 10A related to Embodiment 1 of the invention, and FIGS. 5A and 5B are an explanatory view showing the relationship between the distance from the detection light source section 12 to the target object Ob and the light-receiving intensity of the detection light L2 or the like, and an explanatory view showing an aspect after a driving current to a light source is adjusted.

In the optical position detecting device 10A of the present embodiment, the differential movement between the detection light L2a and the reference light Lr and the differential movement between the detection light L2c and the reference light Lr are used instead of the direct differential movement between the detection light L2a and the detection light L2c, and eventually the same result as the principle described with reference to FIGS. 4A and 4B is derived. Here, the differential movement between the detection light L2a and the reference light Lr and the differential movement between the detection light L2c and the reference light Lr are executed as follows.

As shown in FIG. 5A, in a state where the target object Ob is present in the detection space 10R, the distance to the target object Ob from the first detection light source section 12A, and the light-receiving intensity $D_a$ of the detection light L2a in the photodetector 30 vary monotonously as shown by a solid line SA. On the other hand, the detection intensity in the photodetector 30 of the reference light Lr emitted from the reference light source 12R is constant irrespective of the position of the target object Ob as shown by a solid line SR. Accordingly, the light-receiving intensity $D_a$ of the detection light L2a in the photodetector 30 and the detection intensity $D_r$ of the reference light Lr in the photodetector 30 are different from each other.

Next, as shown in FIG. 5B, at least one of a driving current for the first detection light source section 12A and a driving current for the reference light source 12R is adjusted, and the light-receiving intensity $D_a$ of the detection light L2a in the photodetector 30 and the detection intensity $D_r$ in the photodetector 30 of the reference light Lr are made to coincide with each other. Such a differential movement is performed between the reference light Lr and the detection light L2a and is performed between the reference light Lr and the detection light L2c. Accordingly, it is possible to obtain the ratio of the driving current for the first detection light source section 12A and the driving current for the third detection light source section 12C when a detection result of the detection light L2a or L2c (detection light L3a or L3c reflected by the target object Ob) in the photodetector 30 and a detection result of the reference light Lr in the photodetector 30 become equal to each other. Therefore, whether the target object Ob is present in any position between the first detection light source section 12A and the third detection light source section 12C can be detected.

The above detection principle is mathematically described using an optical path function as follows. First, respective parameters are defined as follows.

T=Reflectivity of target object Ob $A_t$=Distance function when detection light L2 emitted from first detection light source section 12A is reflected by target object Ob and reaches photodetector 30

A=Detection intensity of photodetector 30 when first detection light source section 12A is turned on in a state where target object Ob is present in detection space 10R $C_t$=Distance function when detection light L2 emitted from third detection light source section 12C is reflected by target object Ob and reaches photodetector 30

C=Detection intensity of photodetector 30 when third detection light source section 12C is turned on in a state where target object Ob is present in detection space 10R $R_s$=Optical path coefficient from reference light source 12R to photodetector 30

R=Detection intensity of photodetector 30 when only reference light source 12R is turned on In addition, although the emission intensity of the first detection light source section 12A, the emission intensity of the third detection light source section 12C, the emission intensity of the reference light source 12R are expressed by the product of a driving current and an emission coefficient, the emission coefficient is set to 1 in the following description. Additionally, when the light-receiving intensities in the photodetector 30 become equal to each other in the above differential movement, the driving current for the first detection light source section 12A is defined as $I_A$, the driving current for the third detection light source section 12C is defined as $I_C$, and the driving current for the reference light source 12R is defined as $I_R$. Additionally, it is assumed that the detection intensity of the photodetector 30 when only the reference light source 12R is turned on during differential movement is the same in the differential movement from the first detection light source section 12A and in the differential movement from the third detection light source section 12C.

Additionally, when the above-mentioned differential movement is performed in a state where the target object Ob is present in the detection space 10R, the following relationships are obtained.

$$A = T \times A_t \times I_A + \text{Environmental light} \quad (6)$$

$$C = T \times C_t \times I_C + \text{Environmental light} \quad (7)$$

$$R = R_s \times I_R + \text{Environmental light} \quad (8)$$

Here, since the detection intensity of the photodetector 30 is equal during differential movement, the following expressions are derived from Expressions (6) and (8):

$$T \times A_t \times I_A + \text{Environmental light} = R_s \times I_R + \text{Environmental light}$$

$$T \times A_t \times I_A = R_s \times I_R$$

$$T \times A_t = R_s \times I_R / I_A \quad (9)$$

and the following expressions are derived from expressions (7) and (8)

$$T \times C_t \times I_C + \text{Environmental light} = R_s \times I_R + \text{Environmental light}$$

$$T \times C_t \times I_C = R_s \times I_R$$

$$T \times C_t = R_s \times I_R / I_C \quad (10)$$

Additionally, since the ratio $P_{AC}$ of the distance functions $A_t$ and $C_t$ is defined by the following expression:

$$P_{AC} = A_t / C_t \quad (11),$$

the ratio of the distance function $P_{AC}$ is expressed as shown below from Expressions (9) and (10):

$$P_{AC} = I_C / I_A \quad (12).$$

In this Expression (12), the item of the environmental light and the item of the reflectivity of the target object Ob are not present. Therefore, the environmental light and the reflectivity of the target object Ob do not influence the ratio PAC of the optical path coefficients $A_t$ and $C_t$. In addition, the correction for offsetting the influence or the like of the detection light L2 which has been incident without being reflected by the target object Ob may be performed on the above mathematical model. Additionally, even when the detection intensity of the photodetector 30 when only the reference light source 12R is turned on is set to a different value in the differential movement from the first detection light source section 12A, and the differential movement from the third detection light source section 12C, the same principle is basically established.

Here, a light source used in the detection light source section 12 is a point light source, and the light intensity thereof at a certain point is inversely proportional to the square of the distance from the light source. Accordingly, the ratio of the separation distance P1 between the first detection light source section 12A and the target object Ob and the separation distance P2 between the third detection light source section 12C and the target object Ob is obtained according to the following expression.

$$P_{AC} = (P1)^2 : (P2)^2$$

Therefore, it can be seen that the target object Ob is located on an equal ratio line passing through a position obtained by dividing an imaginary line which connects the first detection light source section 12A and the third detection light source section 12C in P1:P2.

Similarly, if the ratio of the distance between the second detection light source section 12B and the target object Ob and the distance between the fourth detection light source section 12D and the target object Ob is obtained using the differential movement between the second detection light source section 12B and the reference light source 12R and the differential movement between the fourth detection light source section 12D and the reference light source 12R, it can be seen that the target object Ob is present on an equal ratio line passing through a position which divides an imaginary line which connects the second detection light source section 12B and the fourth detection light source section 12D by a predetermined ratio. Therefore, the X coordinate and Y coordinate of the target object Ob can be detected. In addition, the above method is a method of geometrically describing the principle adopted in the present embodiment. In practice, the calculation is performed using the obtained data.

Figure 6A:
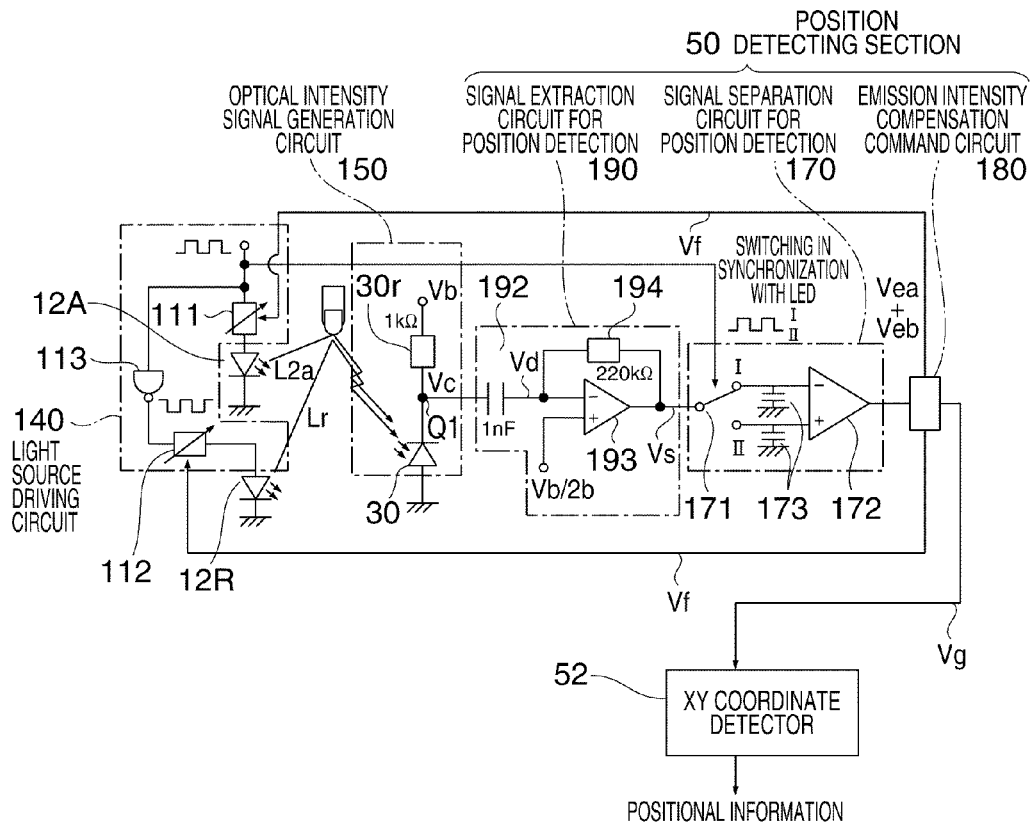
FIGS. 6A and 6B are explanatory views showing the contents of processing performed by a position detecting section, in the optical position detecting device related to Embodiment 1 of the invention.
Figure 6B:
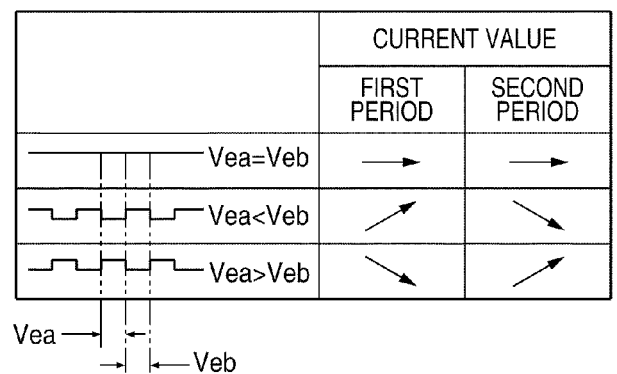

Configuration Example of the Position Detecting Section 50 for Differential Movement FIGS. 6A and 6B are explanatory views showing the contents of processing performed by a position detecting section 50, in the optical position detecting device 10A related to Embodiment 1 of the invention.

In carrying out the above differential movement, it is possible to adopt a configuration in which processing is performed by using a microprocessor unit (MPU) as the position detecting section 50, and thereby, executing predetermined software (operation program). Additionally, it is also possible to adopt a configuration in which processing is performed in a signal processor using hardware, such as a logical circuit, as will be described below with reference to FIGS. 6A and 6B. In addition, although the differential movement described with reference to FIGS. 5A and 5B is shown in FIGS. 6A and 6B, if the reference light source 12R is replaced with the detection light source section 12, the invention can be applied to the differential movement described with reference to FIGS. 4A and 4B.

As shown in FIG. 6A, in the optical position detecting device 10A of the present embodiment, the light source driving circuit 140 applies a driving pulse of a predetermined current value to the first detection light source section 12A via a variable resistance 111, and applies a driving pulse of a predetermined current value to the reference light source 12R via a variable resistance 112 and an inverting circuit 113. For this reason, since reversed-phase driving pulses are applied to the first detection light source section 12A and the reference light source 12R, the first detection light source section 12A and the reference light source 12R are alternately turned on. Also, when the first detection light source section 12A is turned on, the light reflected by the target object Ob in the detection light L2a is received in the photodetector 30, and when the reference light source 12R is turned on, the reference light Lr is received in the photodetector 30. In the light intensity signal generation circuit 150, a resistor 30r of about 1 kΩ is electrically connected in series to the photodetector 30, and a bias voltage Vb is applied to both ends thereof.

In the light intensity signal generation circuit 150, the position detecting section 50 is electrically connected to a connection point Q1 between the photodetector 30 and the resistor 30r. A detection signal Vc output from the connection point Q1 between the photodetector 30 and the resistor 30r is expressed by the following expression.

$Vc = V30/(V30 + \text{resistance value of resistor } 30r)$

V30: equivalent resistance value of photodetector 30

Accordingly, when a case where the environmental light Lc does not enter the photodetector 30 is compared with a case where the environmental light Lc enters the photodetector 30, the level and amplitude of the detection signal Vc become large in the case where the environmental light Lc enters the photodetector 30.

The position detecting section 50 generally includes a signal extraction circuit 190 for position detection, a signal separation circuit 170 for position detection, and an emission intensity compensation command circuit 180. The signal extraction circuit 190 for position detection includes a filter 192 formed of a capacitor of about 1 nF, and the filter 192 functions as a high-pass filter which removes a direct-current component from a signal output from the connection point Q1 between the photodetector 30 and the resistor 30r. For this reason, only a position detection signal Vd by the photodetector 30 is extracted from the detection signal Vc output from the connection point Q1 between the photodetector 30 and the resistor 30r by the filter 192. That is, since it can be regarded that the detection light L2a and the reference light Lr are modulated, whereas the environmental light Lc has a constant intensity within a certain period, a low-frequency component or direct-current component resulting from the environmental light Lc is removed by the filter 192.

Additionally, the signal extraction circuit 190 for position detection has an adder circuit 193 including a feedback resister 194 of about 220 kΩ in a subsequent stage of the filter 192, and the position detection signal Vd extracted by the filter 192 is output to the signal separation circuit 170 for position detection as a position detection signal Vs on which a voltage V/2 of ½ times the bias voltage Vb is overlapped.

The signal separation circuit 170 for position detection includes a switch 171 which performs a switching operation in synchronization with a driving pulse applied to the first detection light source section 12A, a comparator 172, and a capacitor 173 which is electrically connected to an input line of the comparator 172. For this reason, when the position detection signal Vs is input to the signal separation circuit 170 for position detection, an effective value Vea of the position detection signal Vs when the first detection light source section 12A is turned on and an effective value Veb of the position detection signal Vs when the reference light source 12R is turned on are alternately output to the emission intensity compensation command circuit 180 from the signal separation circuit 170 for position detection.

The emission intensity compensation command circuit 180 compares the effective values Vea and Veb with each other, performs the processing shown in FIG. 6B, and outputs a control signal Vf to the light source driving circuit 140 so that the effective value Vea of the position detection signal Vs and the effective value Veb of the position detection signal Vs become the same level. That is, the emission intensity compensation command circuit 180 compares the effective value Vea of the position detection signal Vs with the effective value Veb of the position detection signal Vs, and maintains the present driving conditions in a case where the effective values are equal to each other. On the other hand, in a case where the effective value Vea of the position detection signal Vs is lower than the effective value Veb of the position detection signal Vs, the emission intensity compensation command circuit 180 reduces the resistance value of the variable resistance 111, and increases the quantity of the light emitted from the first detection light source section 12A. Additionally, in a case where the effective value Veb of the position detection signal Vs is lower than the effective value Vea of the position detection signal Vs, the emission intensity compensation command circuit 180 reduces the resistance value of the variable resistance 112, and increases the quantity of the light emitted from the reference light source 12R.

In this way, in the optical position detecting device 10A, the controlled variables (driving currents) of the first detection light source section 12A and the reference light source 12R are controlled by the emission intensity compensation command circuit 180 of the position detecting section 50 so that the amounts of detection by the photodetector 30 during the turning on operation of the first detection light source section 12A and the turning on operation of the reference light source 12R become equal to each other. Accordingly, information on the driving currents for the first detection light source section 12A and the reference light source 12R such that the amounts of detection by the photodetector 30 during the turning on operation of the first detection light source section 12A and the turning on operation of the reference light source 12R become equal to each other exist in the emission intensity compensation command circuit 180, and this information is output to the position detecting section 50 as a position detection signal Vg.

The same processing is performed even between the other light source sections 12 (the second detection light source section 12B to the fourth detection light source section 12D) for detection, and the reference light source 12R.

Detection of the Z Coordinate

In the optical position detecting device 10A of the present embodiment, when the first detection light source section 12A to the fourth detection light source section 12D are simultaneously turned on, a light intensity distribution for Z coordinate detection is formed in which intensity decreases monotonously in the normal direction to the first surface 41 are formed on the first surface 41 side (detection space 10R) of the translucent member 40. In this light intensity distribution for Z coordinate detection, intensity decreases monotonously as it separates from the first surface of the translucent member 40. Accordingly, in the Z coordinate detector 53 of the position detecting section 50, the Z coordinate of the target object Ob can be detected on the basis of the difference or ratio of the detection values in the photodetector 30 when the reference light source 12R, and all the first detection light source section 12A to the fourth detection light source section 12D are alternately turned on. Additionally, the Z coordinate of the target object Ob may be detected on the basis of the difference or ratio of the total value of detection values in the photodetector 30 when the first detection light source section 12A to the fourth detection light source section 12D are sequentially turned on and detection values in the photodetector 30 when the reference light source 12R is turned on.

Additionally, in the Z coordinate detector 53 of the position detecting section 50, the Z coordinate of the target object Ob can be detected on the basis of the difference or ratio of the driving current for the reference light source 12R and the driving currents for the first detection light source section 12A to the fourth detection light source section 12D when the detection values in the photodetector 30 when the reference light source 12R and all the first detection light source section 12A to the fourth detection light source section 12D are alternately turned on become equal to each other. Additionally, the Z coordinate of the target object Ob may be detected on the basis of the difference or ratio of the total value of driving current values when the first detection light source section 12A to the fourth detection light source section 12D are sequentially and differentially moved from the reference light source 12R, and the driving current for the reference light source 12R.

Switching of Detection Space 10R

FIGS. 7A to 7C are explanatory views showing that the size of the detection space 10R is switched, in the optical position detecting device 10A related to Embodiment 1 of the invention.

In the optical position detecting device 10A of the present embodiment, the first detection light source section 12A includes the first light-emitting element $12A_1$ to the third light-emitting element $12A_3$. In the first detection light source section 12A, the light source driving section 14 can execute a first mode where only the first light-emitting element $12A_1$ is turned on, and a second mode where a plurality of light-emitting elements including the first light-emitting element $12A_1$ are turned on. Similarly, the second detection light source section 12B to the fourth detection light source section 12D include the first light-emitting elements $12B_1$, $12C_1$, and $12D_1$ to the third light-emitting elements $12B_3$, $12C_3$, and $12D_3$, and the light source driving section 14 can execute the first mode where only the first light-emitting elements $12B_1$ to $12D_1$ are turned on, and the second mode where a plurality of light-emitting elements including the first light-emitting elements $12B_1$ to $12D_1$ are turned on.

Thus, in the present embodiment, in a case where it is known that the target object Ob is present within a narrow range, the first mode is performed, and the detection space 10R is set to the narrow range. On the other hand, in a case where the target object Ob is present within a wide range, the second mode is performed to extend the detection space 10R. Here, the light source driving section 14 turns on some light-emitting elements among a plurality of light-emitting elements in the first mode, and simultaneously turns on more light-emitting elements, including the light-emitting elements turned on in the first mode, than those in the first mode, in the second mode. Here, in a case where the number of the light-emitting elements turned on in the first mode is one, two or more light-emitting elements including the light-emitting element turned on in the first mode are simultaneously turned on in the second mode.

More specifically, when the X coordinate of the target object Ob is detected using the first detection light source section 12A and the third detection light source section 12C, in a case where it is known that the target object Ob is present within a narrow range, as shown in FIG. 7A, the light source driving section 14 turns on only the first light-emitting elements $12A_1$ and $12C_1$ and makes detection lights $L2a_1$ (L2a) and $L2c_1$ (L2c) emitted as the detection light L2 from the first light-emitting elements $12A_1$ and $12C_1$ (first mode). The size of the detection space 10R (detection space $10R_1$) in the X-axis direction in this state is a size shown by an arrow $XS_1$ in FIG. 7A, and the size of the detection space 10R (detection space $10R_1$) in the Z-axis direction is a size shown by an arrow $ZS_1$ in FIG. 7A.

Next, in a case where the target object Ob is possibly present within a slightly wider range, as shown in FIG. 7B, the light source driving section 14 turns on the first light-emitting elements $12A_1$ and $12C_1$ and the second light-emitting elements $12A_2$ and $12C_2$ (second mode). As a result, the first light-emitting elements $12A_1$ and $12C_1$ emit the detection lights $L2a_1$ and $L2c_1$, and the second light-emitting elements $12A_2$ and $12C_2$ emit the detection lights $L2a_2$ and $L2c_2$. The detection lights $L2a_1$ and $L2a_2$ are emitted as continuous integral detection light L2a, and the detection lights $L2c_1$ and $L2c_2$ are emitted as continuous integral detection light L2c. The size of the detection space 10R (detection space $10R_2$) in the X-axis direction in this state is continuously extended to a range shown by an arrow $XS_2$ in FIG. 7B, and the size of the detection space 10R (detection space $10R_2$) in the Z-axis direction is extended to a range shown by an arrow $ZS_2$ in FIG. 7B. In that case, the light source driving section 14 makes the light-emitting intensity of the detection light L2 from the second light-emitting elements $12A_2$ and $12C_2$ larger than the light-emitting intensity of the detection light L2 from the first light-emitting elements $12A_1$ and $12C_1$. For this reason, no great change occurs in light intensity distribution or the like in the detection space 10R before and after the detection space 10R is extended. In addition, if the same switching is performed even in the second detection light source section 12B and the fourth detection light source section 12D, the detection space 10R can be extended in the Y-axis direction.

Next, in a case where the target object Ob is possibly present within a further wider range, as shown in FIG. 7C, the light source driving section 14 turns on the first light-emitting elements $12A_1$ and $12C_1$, the second light-emitting elements $12A_2$ and $12C_2$, and the third light-emitting elements $12A_3$ and $12C_3$ (second mode). As a result, the first light-emitting elements $12A_1$ and $12C_1$ emit the detection lights $L2a_1$ and $L2c_1$, the second light-emitting elements $12A_2$ and $12C_2$ emit the detection lights $L2a_2$ and $L2c_2$, and the third light-emitting element $12A_3$ and $12C_3$ emit the detection lights $L2a_3$ and $L2c_3$. The detection lights $L2a_4$, $L2a_2$, and $L2a_3$ are emitted as continuous integral detection light L2a, and the detection lights $L2c_1$, $L2c_2$, $L2c_3$ are emitted as continuous integral detection light L2c. The size of the detection space 10R (detection space $10R_3$) in the X-axis direction in this state is extended to a range shown by an arrow $XS_3$ in FIG. 7C, and the size of the detection space 10R (detection space 10R3) in the Z-axis direction is extended to a range shown by an arrow $ZS_3$ in FIG. 7C. In that case, the light source driving section 14 makes the light-emitting intensity of the detection light L2 from the second light-emitting elements $12A_2$ and $12C_2$ larger than the light-emitting intensity of the detection light L2 from the first light-emitting elements $12A_1$ and $12C_1$, and makes the light-emitting intensity of the detection light L2 from the third light-emitting elements $12A_3$ and $12C_3$ larger than the light-emitting intensity of the detection light L2 from the second light-emitting elements $12A_2$ and $12C_2$. For this reason, no great change occurs in light intensity distribution or the like in the detection space 10R before and after the detection space 10R is extended. In addition, if the same switching is performed even in the second detection light source section 12B and the fourth detection light source section 12D, the detection space 10R can be extended in the Y-axis direction.

Main Effects of the Present Embodiment

As described above, in the optical position detecting device 10A of the present embodiment, the light source driving section 14 turns on the plurality of detection light source sections 12 sequentially, and the photodetector 30 receives the detection light L3 reflected by the target object Ob during that time. Accordingly, if a detection result in the photodetector 30 is directly used, or a driving current when the two detection light source sections 12 are differentially moved via the photodetector 30 is used, the position detecting section 50 can detect the position of the target object Ob.

Here, the first detection light source section 12A to the fourth detection light source section 12D include the first light-emitting elements $12A_1$, $12B_1$, $12C_1$, and $12D_1$ to the third light-emitting elements $12A_3$, $12B_3$, $12C_3$, and $12D_3$, and the light source driving section 14 can execute the first mode where only the first light-emitting elements $12A_1$ to $12D_1$ are turned on, and the second mode where a plurality of light-emitting elements including the first light-emitting elements $12A_1$ to $12D_1$ are turned on. Additionally, in the first detection light source section 12A to the fourth detection light source section 12D, the central optical axes of the light-emitting elements are arranged parallel to each other, and the first light-emitting elements $12A_2$, $12B_1$, $12C_1$, and $12D_2$, the second light-emitting elements $12A_2$, $12B_2$, $12C_2$, and $12D_2$ and the third light-emitting elements $12A_3$, $12B_3$, $12C_3$, and $12D_3$ have the central optical axes directed from the inside of the detection space 10R to the outside thereof in this order. For this reason, in a case where the detection space 10R of the target object Ob is set to be wide, the number of light-emitting elements to be turned on can be increased to extend the emitting space, and in a case where the detection space 10R of the target object Ob is set to be narrow, the number of light-emitting elements to be turned on can be reduced, to narrow the emitting space. Accordingly, since the electric power required to turn on the light sources is not wastefully consumed, a reduction in power consumption can be achieved. Particularly, in the present embodiment, the light source driving section 14 can execute the first mode where one light-emitting element among the plurality of light-emitting elements is turned on. Therefore, since the detection space 10R can be narrowed to the minimum, it is possible to significantly reduce the electric power consumed to turn on the light sources. Additionally, since the emitting space (detection space 10R) of the detection light L2 is variable, the target object Ob only in a specific narrow space can also be detected.

Additionally, in the present embodiment, since the differential movement in the two detection light source sections 12 or the differential movement between the detection light source section 12 and the reference light source 12R is used, the influence of environmental light or the like can be automatically corrected. Moreover, since the detection light L2 is infrared light, the detection light is not viewed. Accordingly, the optical position detecting device 10A can be used for various apparatuses without hindering display even in a case where the optical position detecting device 10A of the present embodiment is applied to a display apparatus.

Embodiment 2

Overall Configuration

Figure 8:
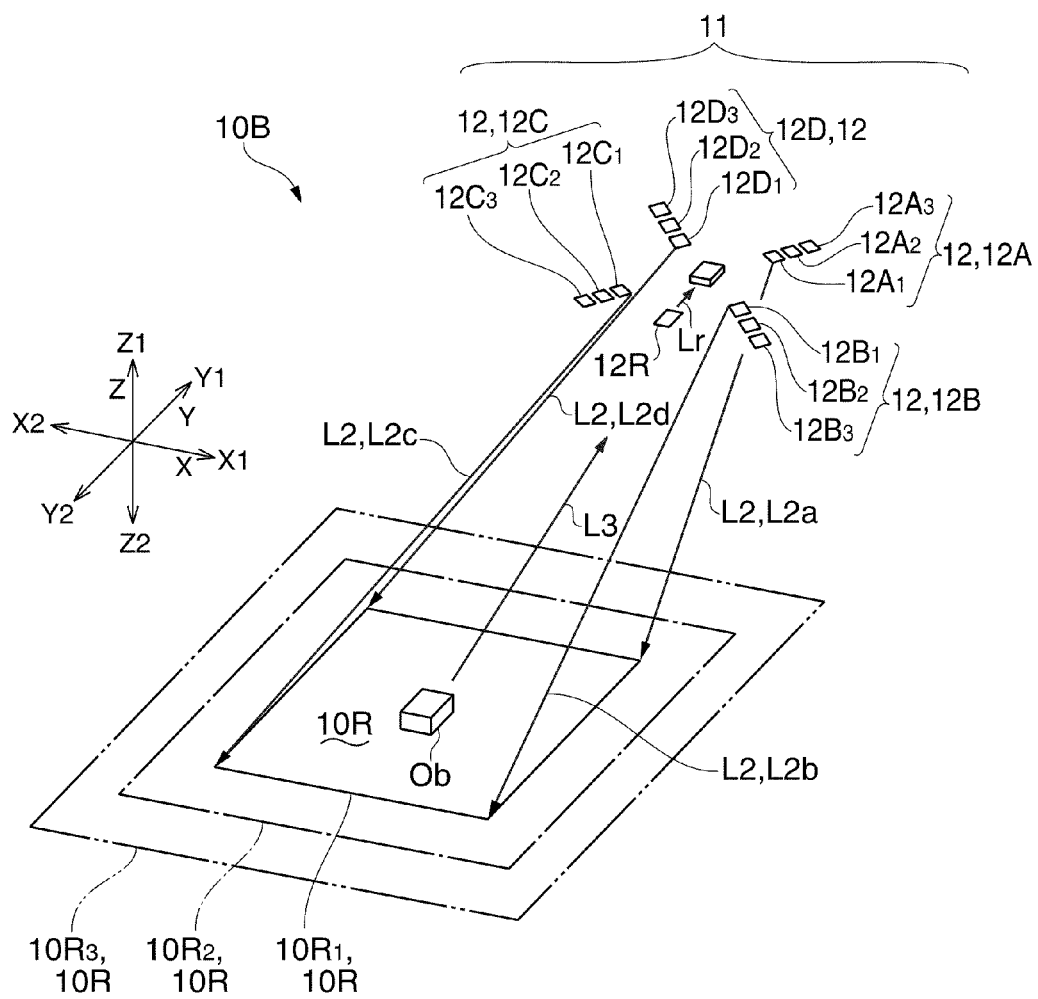
FIG. 8 is an explanatory view showing sections of an optical position detecting device related to Embodiment 2 of the invention.
Figure 9A:
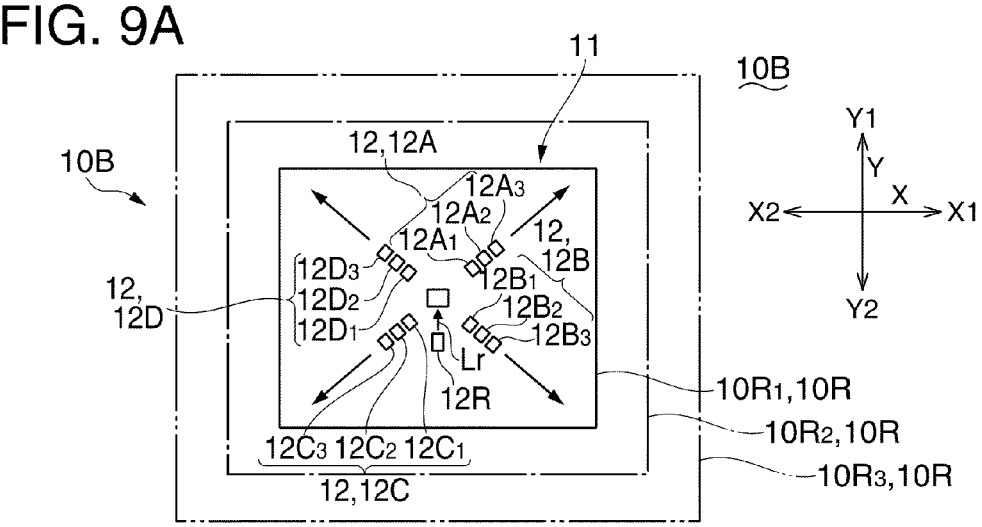
FIGS. 9A and 9B are explanatory views showing the positional relationship between a detection light source section and a detection space in the optical position detecting device related to Embodiment 2 of the invention.
Figure 9B:
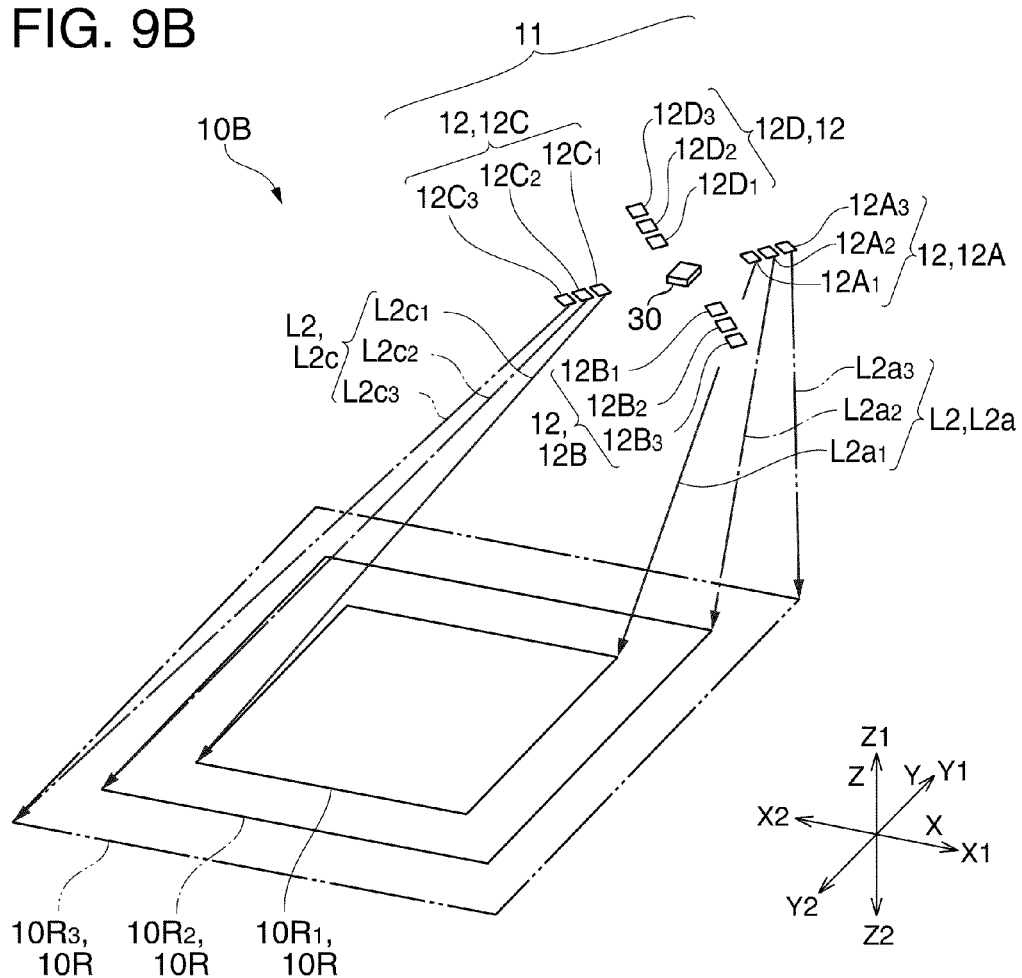

FIG. 8 is an explanatory view showing sections of an optical position detecting device related to Embodiment 2 of the invention. FIGS. 9A and 9B are explanatory views showing the positional relationship between the detection light source sections and the detection space in the optical position detecting device related to Embodiment 2 of the invention, and FIGS. 9A and 9B are an explanatory view showing the arrangement of the light-emitting elements in the detection light source sections, and an explanatory view showing a direction in which the central optical axes extend from the light-emitting elements. In addition, since the basic configuration of the present embodiment is the same as that of Embodiment 1, common portions are designated by the same reference numerals, and the description thereof is omitted.

In FIG. 8, the optical position detecting device 10B of the present embodiment is an optical device used as a sensor device or the like which detects whether or not there is any obstacle in the emission direction of the detection light L2. The optical position detecting device 10B of the present embodiment includes a light source unit 11 including a plurality of detection light source sections 12 which emit detection light L2 from one side Z1 in the Z-axis direction toward the other side Z2, and a photodetector 30 which detects detection light L3 reflected by the target object Ob on the other side Z2 in the Z-axis direction. In addition, the optical position detecting device 10B of the present embodiment also has the electric configuration described with reference to FIG. 3, and the plurality of detection light source sections 12 is driven by the light source driving section 14 described with reference to FIG. 3.

Detailed Configuration of the Detection Light Source Sections 12

In the present embodiment, the light source unit 11 includes a first detection light source section 12A, a second detection light source section 12B, a third detection light source section 12C, and a fourth detection light source section 12D as a plurality of detection light source sections 12, and these detection light source sections 12 all have light-emitting portions which are directed to the other side Z2 in the Z-axis direction. Additionally, the first detection light source section 12A to the fourth detection light source section 12D include mutually different optical axes, and emit the detection light L2 (detection lights L2a to L2d) toward mutually different positions of the other side Z2 in the Z-axis direction. In the present embodiment, the first detection light source section 12A to the fourth detection light source section 12D have their optical axes directed to mutually different angular portions among the four angular portions of a quadrangle, respectively. More specifically, although the optical axis of the first detection light source section 12A and the optical axis of the second detection light source section 12B are at the same position in the X-axis direction, the optical axes have has shifted in the Y-axis direction, and although the optical axis of the third detection light source section 12C and the optical axis of the fourth detection light source section 12D are at the same position in the X-axis direction, the optical axes have shifted in the Y-axis direction. Additionally, although the optical axis of the first detection light source section 12A and the optical axis of the fourth detection light source section 12D are at the same position in the Y-axis direction, the optical axes have has shifted in the X-axis direction, and although the optical axis of the second detection light source section 12B and the optical axis of the third detection light source section 12C are at the same position in the Y-axis direction, the optical axes have shifted in the X-axis direction.

In this way, the detection space 10R where the position of the target object Ob is detected is constituted by the emitting space to which the detection light L2 is emitted, and the detection light L3 reflected by the target object Ob is received in this detection space 10R by the photodetector 30.

Additionally, the light source unit 11 also includes a reference light source 12R in which a light-emitting portion is directed to the photodetector 30. The reference light source 12R is constituted by an LED (light emission diode) or the like, and the reference light source 12R emits reference light Lr of infrared light whose peak wavelength is located within a range of 840 to 1000 nm as divergence light. Here, the reference light Lr emitted from the reference light source 12R enters the photodetector 30, without travelling through the detection space 10R, by the orientation of the reference light source 12R, a light-shielding cover (not shown) provided in the reference light source 12R, or the like. The photodetector 30 is a photodiode, a photo transistor, or the like in which the light-receiving portion is directed to the detection space 10R. In the present embodiment, the photodetector 30 is a photodiode including a sensitivity peak in the infrared region.

As shown in FIGS. 8 and 9A, in the present embodiment, the first detection light source section 12A to the fourth detection light source section 12D are arranged in this order around the central optical axis of the photodetector 30 as seen from the detection space 10R (Z-axis direction), and the photodetector 30 is located inside the region surrounded by the plurality of detection light source sections 12.

In the optical position detecting device 10B of the present embodiment, each of the plurality of detection light source sections 12 includes a plurality of light-emitting elements whose optical axes become parallel to each other. In the present embodiment, the detection light source section 12 includes three light-emitting elements. More specifically, the first detection light source section 12A includes a first light-emitting element $12A_1$ whose central optical axis is directed to the innermost side within the XY plane of the detection space 10R, a second light-emitting element $12A_2$ whose central optical axis is directed to the detection space 10R outside the first light-emitting element $12A_1$, and a third light-emitting element $12A_3$ whose central optical axis is directed to the detection space 10R outside the second light-emitting element $12A_2$. Here, places through which the central optical axes of the first light-emitting element $12A_1$ to the third light-emitting element $12A_3$ pass in the detection space 10R are lined up on the same straight line within the XY plane (in the viewing surface) of the detection space 10R. Similarly, the second detection light source section 12B to the fourth detection light source section 12D have the first light-emitting elements $12B_1$ to $12D_1$ whose central optical axes are directed to the innermost side within the XY plane of the detection space 10R, second light-emitting elements $12B_2$ to $12D_2$ whose central optical axes are directed to the detection space 10R outside the first light-emitting elements $12B_1$ to $12D_1$, and third light-emitting elements $12B_3$ to $12D_3$ whose central optical axes are directed to the detection space 10R outside the second light-emitting elements $12B_2$ to $12D_2$. Additionally, places through which the central optical axes of the first light-emitting element $12B_1$ to the third light-emitting element $12B_3$ pass in the detection space 10R are lined up on the same straight line within the XY plane. Places through which the central optical axes of the first light-emitting element $12C_1$ to the third light-emitting element $12C_3$ pass in the detection space 10R are lined up on the same straight line within the XY plane. Places through which the central optical axes of the first light-emitting element $12D_1$ to the third light-emitting element $12D_3$ pass in the detection space 10R are lined up on the same straight line within the XY plane.

All the first light-emitting elements $12A_1$ to $12D_1$, the second light-emitting elements $12A_2$ to $12D_2$, and the third light-emitting elements $12A_3$ to $12D_3$ are respectively constituted by light-emitting elements, such as LEDs (light emission diodes), and emit the detection light L2 (detection light L2a to L2d) of infrared light whose peak wavelength is located within a range of 840 to 1000 nm as divergence light.

In addition, even in the present embodiment, similarly to Embodiment 1, the ratio of the distance between the optical central axis of one detection light source section 12 of the two detection light source sections 12 and the target object Ob and the distance between the optical central axis of another detection light source section 12 and the target object Ob is obtained by the differential movement between the detection light source sections 12 or the differential movement between the detection light source section 12 and the reference light source 12R, and the position of the target object Ob is detected on the basis of this ratio. Some or all of the first light-emitting elements $12A_1$ to $12D_1$, the second light-emitting elements $12A_2$ to $12D_2$, and the third light-emitting elements $12A_3$ to $12D_3$ are used during this differential movement.

Switching of the Detection Space 10R

Even in the optical position detecting device 10B of the present embodiment, similarly to Embodiment 1, the first detection light source section 12A includes the first light-emitting element $12A_1$ to the third light-emitting element $12A_3$. In the first detection light source section 12A, the light source driving section 14 described with reference to FIG. 3 can execute a first mode where only the first light-emitting element $12A_1$ is turned on, and a second mode where a plurality of light-emitting elements including the first light-emitting element $12A_1$ are turned on. Similarly, the second detection light source section 12B to the fourth detection light source section 12D include the first light-emitting elements $12B_1$, $12C_1$, and $12D_1$ to the third light-emitting elements $12B_3$, $12C_3$, and $12D_3$, and the light source driving section 14 described with reference to FIG. 3 can execute the first mode where only the first light-emitting elements $12B_1$ to $12D_1$ are turned on, and the second mode where a plurality of light-emitting elements including the first light-emitting elements $12B_1$ to $12D_1$ are turned on.

Thus, in the present embodiment, in a case where it is known that the target object Ob is present within a narrow range, the first mode is performed, and the detection space 10R is set to the narrow range. On the other hand, in a case where the target object Ob is present within a wide range, the second mode is performed to extend the detection space 10R.

More specifically, for example, in a case where it is known that the target object Ob is present within a narrow range in the first detection light source section 12A and the third detection light source section 12C, in, as shown in FIG. 9B, the light source driving section 14 turns on only the first light-emitting elements $12A_1$ and $12C_1$ and makes detection lights $L2a_1$ (L2a) and $L2c_1$ (L2c) emitted from the first light-emitting elements $12A_1$ and $12C_1$ (first mode). The sizes of the detection space 10R (detection space $10R_1$) in the X-axis direction and the Y-axis direction in this state are sizes shown by solid lines in FIG. 8 and FIGS. 9A and 9B.

Next, in a case where the target object Ob is possibly present within a slightly wider range, the light source driving section 14 turns on the first light-emitting elements $12A_1$ and $12C_1$ and the second light-emitting elements $12A_2$ and $12C_2$ (second mode). As a result, the first light-emitting elements $12A_1$ and $12C_1$ emit the detection lights $L2a_1$ and $L2c_1$, and the second light-emitting elements $12A_2$ and $12C_2$ emit the detection lights $L2a_2$ and $L2c_2$. The detection lights $L2a_1$ and $L2a_2$ are emitted as continuous integral detection light L2a, and the detection lights $L2c_1$ and $L2c_2$ are emitted as continuous integral detection light L2c. The sizes of the detection space 10R (detection space $10R_2$) in the X-axis direction and the Y-axis direction in this state are extended to a range shown by one-dotted chain lines in FIG. 8 and FIGS. 9A and 9B. In that case, the light source driving section 14 makes the light-emitting intensity of the detection light L2 from the second light-emitting elements $12A_2$ and $12C_2$ larger than the light-emitting intensity of the detection light L2 from the first light-emitting elements $12A_1$ and $12C_1$. For this reason, no great change occurs in light intensity distribution or the like in the detection space 10R before and after the detection space 10R is extended.

Next, in a case where the target object Ob is possibly present within a further wider range, the light source driving section 14 turns on the first light-emitting elements $12A_1$ and $12C_1$, the second light-emitting elements $12A_2$ and $12C_2$, and the third light-emitting elements $12A_3$ and $12C_3$ (second mode). As a result, the first light-emitting elements $12A_1$ and $12C_1$ emit the detection lights $L2a_1$ and $L2c_1$, the second light-emitting elements $12A_2$ and $12C_2$ emit the detection lights L2$a_2$ and L2$c_2$, and the third light-emitting element 12A$_3$ and 12C$_3$ emit the detection lights L2$a_3$ and L2$c_3$. The detection lights L2$a_1$, L2$a_2$, and L2$a_3$ are emitted as continuous integral detection light L2$a$, and the detection lights L2$c_1$, L2$c_2$, L2$c_3$ are emitted as continuous integral detection light L2$c$. The sizes of the detection space 10R (detection space 10R$_3$) in the X-axis direction and the Y-axis direction in this state are extended to a range shown by double-dotted chain lines in FIG. 8 and FIGS. 9A and 9B. In that case, the light source driving section 14 makes the light-emitting intensity of the detection light L2 from the second light-emitting elements 12A$_2$ and 12C$_2$ larger than the light-emitting intensity of the detection light L2 from the first light-emitting elements 12A$_1$ and 12C$_1$, and makes the light-emitting intensity of the detection light L2 from the third light-emitting elements 12A$_3$ and 12C$_3$ larger than the light-emitting intensity of the detection light L2 from the second light-emitting elements 12A$_2$ and 12C$_2$. For this reason, no great change occurs in light intensity distribution or the like in the detection space 10R before and after the detection space 10R is extended.

Detection of the Z Coordinate

In the optical position detecting device 10B of the present embodiment, when the first detection light source section 12A to the fourth detection light source section 12D are simultaneously turned on, a light intensity distribution for Z coordinate detection is formed in which intensity decreases monotonously in the Z-axis direction. Accordingly, the Z coordinate of the target object Ob can be detected on the basis of the difference or ratio of the detection values in the photodetector 30 when the reference light source 12R, and all of the first detection light source section 12A to the fourth detection light source section 12D are alternately turned on. Additionally, the Z coordinate of the target object Ob may be detected on the basis of the difference or ratio of the total value of detection values in the photodetector 30 when the first detection light source section 12A to the fourth detection light source section 12D are sequentially turned on and detection values in the photodetector 30 when the reference light source 12R is turned on.

Additionally, the Z coordinate of the target object Ob can be detected on the basis of the difference or ratio of the driving current for the reference light source 12R and the driving currents for the first detection light source section 12A to the fourth detection light source section 12D when the detection values in the photodetector 30 when the reference light source 12R and all the first detection light source section 12A to the fourth detection light source section 12D are alternately turned on become equal to each other. Additionally, the Z coordinate of the target object Ob may be detected on the basis of the difference or ratio of the total value of driving current values when the first detection light source section 12A to the fourth detection light source section 12D are sequentially and differentially moved from the reference light source 12R, and the driving current for the reference light source 12R.

Here, in the second mode described with reference to FIG. 9B, the light intensity distribution for Z coordinate detection is extended in the X-axis direction and the Y-axis direction as compared to the first mode.

Main Effects of the Present Embodiment

As described above, in the optical position detecting device 10B of the present embodiment, the light source driving section 14 turns on the plurality of detection light source sections 12 sequentially, the photodetector 30 receives the detection light L3 reflected by the target object Ob during that time. Accordingly, if a detection result in the photodetector 30 is directly used, or a driving current when the two detection light source sections 12 are differentially moved via the photodetector 30 is used, the position detecting section 50 can detect the position of the target object Ob.

Here, the first detection light source section 12A to the fourth detection light source section 12D include the first light-emitting elements 12A$_1$, 12B$_1$, 12C$_1$, and 12D$_1$ to the third light-emitting elements 12A$_3$, 12B$_3$, 12C$_3$, and 12D$_3$, and the light source driving section 14 can execute the first mode where only the first light-emitting elements 12A$_1$ to 12D$_1$ whose central optical axes are directed to the innermost side of the detection space 10R are turned on, and the second mode where a plurality of light-emitting elements including the first light-emitting elements 12A$_1$ to 12D$_1$ are turned on. Additionally, in the first detection light source section 12A to the fourth detection light source section 12D, the central optical axes of the light-emitting elements are arranged parallel to each other, and the first light-emitting elements 12A$_1$, 12B$_1$, 12C$_1$, and 12D$_1$, the second light-emitting elements 12A$_2$, 12B$_2$, 12C$_2$, and 12D$_2$ and the third light-emitting elements 12A$_3$, 12B$_3$, 12C$_3$, and 12D$_3$ have the central optical axes directed from the inside of the detection space 10R to the outside thereof in this order. For this reason, in a case where the detection space 10R of the target object Ob is set to be wide, the number of light-emitting elements to be turned on can be increased to extend the emitting space, and in a case where the detection space 10R of the target object Ob is set to be narrow, the number of light-emitting elements to be turned on can be reduced, to narrow the emitting space. Accordingly, since the electric power required to turn on the light sources is not wastefully consumed, a reduction in power consumption can be achieved. Particularly, in the present embodiment, the light source driving section 14 can execute the first mode where one light-emitting element among the plurality of light-emitting elements is turned on. Therefore, since the detection space 10R can be narrowed to the minimum, it is possible to significantly reduce the electric power consumed to turn on the light sources. Additionally, since the emitting space (detection space 10R) of the detection light L2 is variable, the target object Ob only in a specific narrow space can also be detected.

Additionally, in the present embodiment, since the differential movement in the two detection light source sections 12 or the differential movement between the detection light source section 12 and the reference light source 12R is used, the influence of environmental light or the like can be automatically corrected. Moreover, since the detection light L2 is infrared light, the detection light is not viewed. Accordingly, the optical position detecting device 10B can be used for various apparatuses without hindering display even in a case where the optical position detecting device 10B of the present embodiment is applied to a display apparatus.

Embodiment 3

Overall Configuration

Figure 10A:
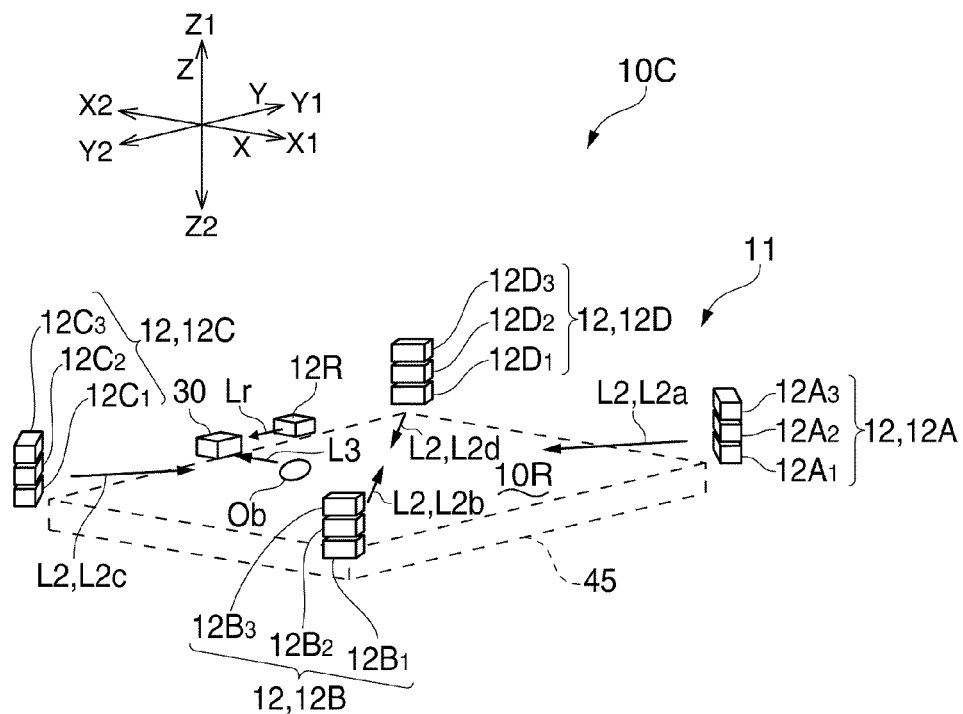
FIGS. 10A and 10B are explanatory views showing sections of an optical position detecting device related to Embodiment 3 of the invention.
Figure 10B:
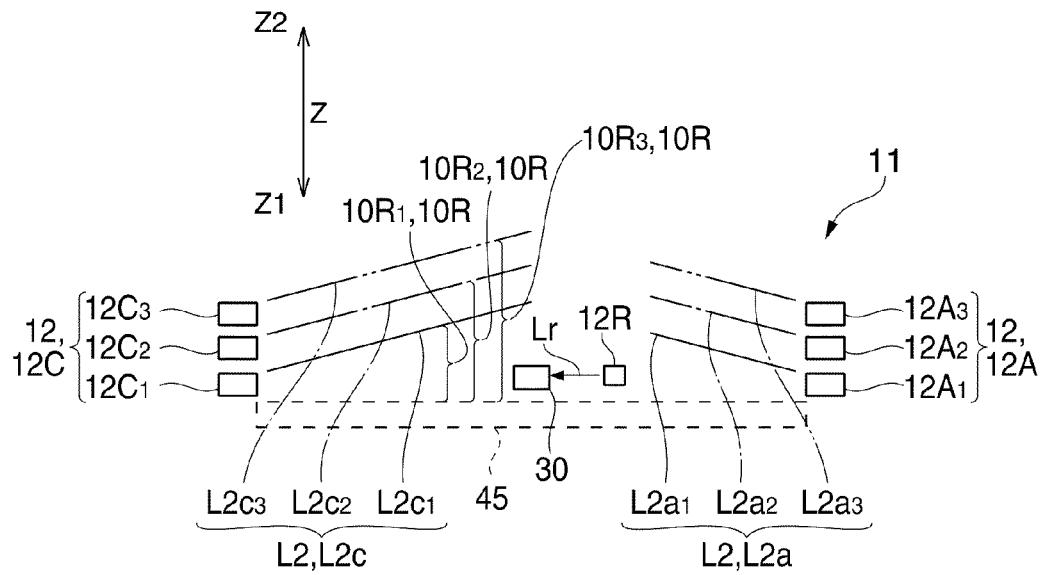

FIGS. 10A and 10B are explanatory views showing sections of an optical position detecting device related to Embodiment 3 of the invention, and FIGS. 10A and 10B are an explanatory view showing the arrangement or the like of the light-emitting elements in the light source sections 12 for detection, and an explanatory view showing that the detection space 10R is switched. In addition, since the basic configuration of the present embodiment is the same as that of Embodiment 1, common portions are designated by the same reference numerals, and the description thereof is omitted.

In FIGS. 10A and 10B, the optical position detecting device 10C of the present embodiment is an optical device used as a sensor device which detects the position or the like of the target object Ob on the side of one surface of plate-shaped member 45 or the like. The optical position detecting device 10C of the present embodiment includes a light source unit 11 including a plurality of detection light source sections 12 which emit detection light L2 in a direction along the XY plane, and a photodetector 30 which detects detection light L3 reflected by the target object Ob on one side X1 in the X-axis direction. In addition, the optical position detecting device 10C of the present embodiment also has the electric configuration described with reference to FIG. 3, and the plurality of detection light source sections 12 is driven by the light source driving section 14 described with reference to FIG. 3.

Detailed Configuration of the Detection Light Source Sections 12

In the present embodiment, the light source unit 11 includes a first detection light source section 12A to a fourth detection light source section 12D as a plurality of detection light source sections 12, and these detection light source sections 12 all have light-emitting portions which are directed to a direction along an XY plane. Additionally, the plurality of detection light source sections 12 includes detection light source sections which emit the detection light L2 in directions opposite to each other on both sides between which the emitting space is pinched (detection space 10R) of the detection light L2. More specifically, the first detection light source section 12A, the second detection light source section 12B, the third detection light source section 12C, and the fourth detection light source section 12D are arranged at the four angular portions of a quadrangle, respectively as seen from the Z-axis direction, and have respectively light-emitting portions which are directed to diagonal positions. For this reason, the optical axis of the first detection light source section 12A and the optical axis of the third detection light source section 12C extend in directions opposite to each other, and the optical axis of the second detection light source section 12B and the optical axis of the fourth detection light source section 12D extend in directions opposite to each other. Additionally the optical axes of the first detection light source section 12A and the third detection light source section 12C and the optical axes of the second detection light source section 12B and the fourth detection light source section 12D extend in directions intersecting each other. Accordingly, the first detection light source section 12A, the second detection light source section 12B, the third detection light source section 12C, and the fourth detection light source section 12D include mutually different optical axes.

In this way, the detection space 10R where the position of the target object Ob is detected is constituted by the emitting space to which the detection light L2 is emitted, and the detection light L3 reflected by the target object Ob is received in this detection space 10R by the photodetector 30.

Additionally, the light source unit 11 also includes a reference light source 12R in which a light-emitting portion is directed to the photodetector 30. The reference light source 12R is constituted by an LED (light emission diode) or the like, and the reference light source 12R emits reference light Lr of infrared light whose peak wavelength is located within a range of 840 to 1000 nm as divergence light. Here, the reference light Lr emitted from the reference light source 12R enters the photodetector 30, without travelling through the detection space 10R, by the orientation of the reference light source 12R, a light-shielding cover (not shown) provided in the reference light source 12R, or the like. The photodetector 30 is a photodiode, a photo transistor, or the like in which the light-receiving portion is directed to the detection space 10R.

In the present embodiment, the photodetector 30 is a photodiode including a sensitivity peak in the infrared region.

In the optical position detecting device 10C of the present embodiment, each of the plurality of detection light source sections 12 includes a plurality of light-emitting elements whose optical axes become parallel to each other. In the present embodiment, the detection light source section 12 includes three light-emitting elements. More specifically, the first detection light source section 12A includes a first light-emitting element $12A_1$, a second light-emitting element $12A_2$, and a third light-emitting element $12A_3$ which are lined up to the one side Z1 from the other side Z2 in the Z-axis direction. Accordingly, the first detection light source section 12A includes a first light-emitting element $12A_1$ whose central optical axis is directed to the inside of the detection space 10R in the Z-axis direction, a second light-emitting element $12A_2$ whose central optical axis is directed to the detection space 10R outside the first light-emitting element $12A_1$ in the Z-axis direction, and a third light-emitting element $12A_3$ whose central optical axis is directed to the detection space 10R outside the second light-emitting element $12A_2$ in the Z-axis direction. Similarly to the first detection light source section 12A, the second detection light source section 12B to the fourth detection light source section 12D include first light-emitting elements $12B_1$ to $12D_1$, second light-emitting elements $12B_2$ to $12D_2$, and third light-emitting elements $12B_3$ to $12D_3$ which are lined up to the one side Z1 from the other side Z2 in the Z-axis direction.

All the first light-emitting elements $12A_1$ to $12D_1$, the second light-emitting elements $12A_2$ to $12D_2$, and the third light-emitting elements $12A_3$ to $12D_3$ are respectively constituted by light-emitting elements, such as LEDs (Light Emitting Diodes), and emit the detection light L2 (detection light L2a to L2d) of infrared light whose peak wavelength is located within a range of 840 to 1000 nm as divergence light.

In addition, in the present embodiment, the X coordinate, Y coordinate, and Z coordinate of the target object Ob are obtained by the differential movement between detection light source sections 12 or the differential movement between the detection light source section 12 and the reference light source 12R.

Additionally, when the first detection light source section 12A to the fourth detection light source section 12D are simultaneously turned on, a light intensity distribution for Z coordinate detection is formed in which intensity decreases monotonously in the Z-axis direction. Accordingly, the Z coordinate of the target object Ob can be detected on the basis of the difference or ratio of the detection values in the photodetector 30 when the reference light source 12R, and all of the first detection light source section 12A to the fourth detection light source section 12D are alternately turned on. Additionally, the Z coordinate of the target object Ob may be detected on the basis of the difference or ratio of the total value of detection values in the photodetector 30 when the first detection light source section 12A to the fourth detection light source section 12D are sequentially turned on and detection values in the photodetector 30 when the reference light source 12R is turned on.

Additionally, the Z coordinate of the target object Ob can be detected on the basis of the difference or ratio of the driving current for the reference light source 12R and the driving currents for the first detection light source section 12A to the fourth detection light source section 12D when the detection values in the photodetector 30 when the reference light source 12R and all the first detection light source section 12A to the fourth detection light source section 12D are alternately turned on become equal to each other. Additionally, the Z coordinate of the target object Ob may be detected on the basis of the difference or ratio of the total value of driving current values when the first detection light source section 12A to the fourth detection light source section 12D are sequentially and differentially moved from the reference light source 12R, and the driving current for the reference light source 12R.

Some or all of the first light-emitting elements $12A_1$ to $12D_1$, the second light-emitting elements $12A_2$ to $12D_2$, and the third light-emitting elements $12A_3$ to $12D_3$ are used during this differential movement.

Switching of the Detection Space 10R

Even in the optical position detecting device 10C of the present embodiment, similarly to Embodiment 1, the first detection light source section 12A includes the first light-emitting element $12A_1$ to the third light-emitting element $12A_3$. In the first detection light source section 12A, the light source driving section 14 described with reference to FIG. 3 can execute a first mode where only the first light-emitting element $12A_1$ is turned on, and a second mode where a plurality of light-emitting elements including the first light-emitting element $12A_1$ are turned on. Similarly, the second detection light source section 12B to the fourth detection light source section 12D include the first light-emitting elements $12B_1$, $12C_1$, and $12D_1$ to the third light-emitting elements $12B_3$, $12C_3$, and $12D_3$, and the light source driving section 14 described with reference to FIG. 3 can execute the first mode where only the first light-emitting elements $12B_1$ to $12D_1$ are turned on, and the second mode where a plurality of light-emitting elements including the first light-emitting elements $12B_1$ to $12D_1$ are turned on.

Thus, in the present embodiment, in a case where it is known that the target object Ob is present within a narrow range in the Z-axis direction, the first mode is performed, and the detection space 10R is set to the narrow range. On the other hand, in a case where the target object Ob is present within a wide range in the Z-axis direction, the second mode is performed to extend the detection space 10R.

More specifically, for example, in a case where it is known that the target object Ob is present within a narrow range in the Z-axis direction in the first detection light source section 12A and the third detection light source section 12C, in, as shown in FIG. 10B, the light source driving section 14 turns on only the first light-emitting elements $12A_1$ and $12C_1$ and makes detection lights $L2a_1$ (L2a) and $L2c_1$ (L2c) emitted from the first light-emitting elements $12A_1$ and $12C_1$ (first mode). The sizes of the detection space 10R (detection space $10R_1$) in the Z-axis direction in this state are sizes shown by solid lines in FIG. 10B.

Next, in a case where the target object Ob is possibly present within a slightly wider range in the Z-axis direction, the light source driving section 14 turns on the first light-emitting elements $12A_1$ and $12C_1$ and the second light-emitting elements $12A_2$ and $12C_2$ (second mode). As a result, the first light-emitting elements $12A_1$ and $12C_1$ emit the detection lights $L2a_1$ and $L2c_1$, and the second light-emitting elements $12A_2$ and $12C_2$ emit the detection lights $L2a_2$ and $L2c_2$. The detection lights $L2a_1$ and $L2a_2$ are emitted as continuous integral detection light L2a, and the detection lights $L2c_1$ and $L2c_2$ are emitted as continuous integral detection light L2c. The size of the detection space 10R (detection space $10R_2$) in the Z-axis direction in this state is a size shown by a one-dotted chain line in FIG. 10B.

Next, in a case where the target object Ob is possibly present within a further wider range in the Z-axis direction, the light source driving section 14 turns on the first light-emitting elements $12A_1$ and $12C_1$, the second light-emitting elements $12A_2$ and $12C_2$, and the third light-emitting elements $12A_3$ and $12C_3$ (second mode). As a result, the first light-emitting elements $12A_1$ and $12C_1$ emit the detection lights $L2a_1$ and $L2c_1$, the second light-emitting elements $12A_2$ and $12C_2$ emit the detection lights $L2a_2$ and $L2c_2$, and the third light-emitting element $12A_3$ and $12C_3$ emit the detection lights $L2a_3$ and $L2c_3$. The detection lights $L2a_1$, $L2a_2$, and $L2a_3$ are emitted as continuous integral detection light L2a, and the detection lights $L2c_1$, $L2c_2$, $L2c_3$ are emitted as continuous integral detection light L2c. The size of the detection space 10R (detection space $10R_3$) in the Z-axis direction in this state is a size shown by a double-dotted chain line in FIG. 10B.

Main Effects of the Present Embodiment

As described above, in the optical position detecting device 10B of the present embodiment, the light source driving section 14 turns on the plurality of detection light source sections 12 sequentially, and the photodetector 30 receives the detection light L3 reflected by the target object Ob during that time. Accordingly, if a detection result in the photodetector 30 is directly used, or a driving current when the two detection light source sections 12 are differentially moved via the photodetector 30 is used, the position detecting section 50 can detect the position of the target object Ob.

Here, the first detection light source section 12A to the fourth detection light source section 12D include the first light-emitting elements $12A_1$, $12B_1$, $12C_1$, and $12D_1$ to the third light-emitting elements $12A_3$, $12B_3$, $12C_3$, and $12D_3$, and the light source driving section 14 can execute the first mode where only the first light-emitting elements $12A_1$ to $12D_1$ are turned on, and the second mode where a plurality of light-emitting elements including the first light-emitting elements $12A_1$ to $12D_1$ are turned on. Additionally, in each of the first detection light source section 12A to the fourth detection light source section 12D, the central optical axes of the light-emitting elements are arranged parallel to each other. For this reason, in a case where the detection space 10R of the target object Ob is set to be wide, the number of light-emitting elements to be turned on can be increased to extend the emitting space, and in a case where the detection space 10R of the target object Ob is set to be narrow, the number of light-emitting elements to be turned on can be reduced, to narrow the emitting space. Accordingly, since the electric power required to turn on the light sources is not wastefully consumed, a reduction in power consumption can be achieved. Particularly, in the present embodiment, the light source driving section 14 can execute the first mode where one light-emitting element among the plurality of light-emitting elements is turned on. Therefore, since the detection space 10R can be narrowed to the minimum, it is possible to significantly reduce the electric power consumed to turn on the light sources. Additionally, since the emitting space (detection space 10R) of the detection light L2 is variable, the target object Ob only in a specific narrow space can also be detected.

Additionally, in the present embodiment, since the differential movement in the two detection light source sections 12 or the differential movement between the detection light source section 12 and the reference light source 12R is used, the influence of environmental light or the like can be automatically corrected. Moreover, since the detection light L2 is infrared light, the detection light is not viewed. Accordingly, the optical position detecting device 10B can be used for various apparatuses without hindering display even in a case where the optical position detecting device 10B of the present embodiment is applied to a display apparatus.

Other Embodiments

In the above embodiment, a number of light-emitting elements of the plurality of light-emitting elements are turned on in the first mode, and the light-emitting elements turned on in the first mode and light-emitting elements different from those in the first mode are simultaneously turned in the second mode. However, a number of light-emitting elements of the plurality of light-emitting elements may be turned on in the first mode, and light-emitting elements different from the light-emitting elements turned on in the first mode may be turned on in the second mode. Even when configured in this way, the size of the detection space can be switched depending on the position of the light-emitting elements.

In the above embodiment, one and then another of a plurality of detection light source sections 12 are alternately turned on when the detection light source sections 12 are differentially moved. However, two and then another two of a plurality of detection light source sections 12 may be alternately turned on.

Additionally, in the above embodiment, one of a plurality of detection light source sections 12 and the reference light source 12R are alternately turned on when the light source sections 12 for detection, and the reference light source 12R are differentially moved. However, after two of a plurality of detection light source sections 12 and the reference light source 12R are alternately turned on, the other two light source sections and the reference light source 12R may be alternately turned on.

Example of a Use of the Optical Position Detecting Device 10

Figure 11A:
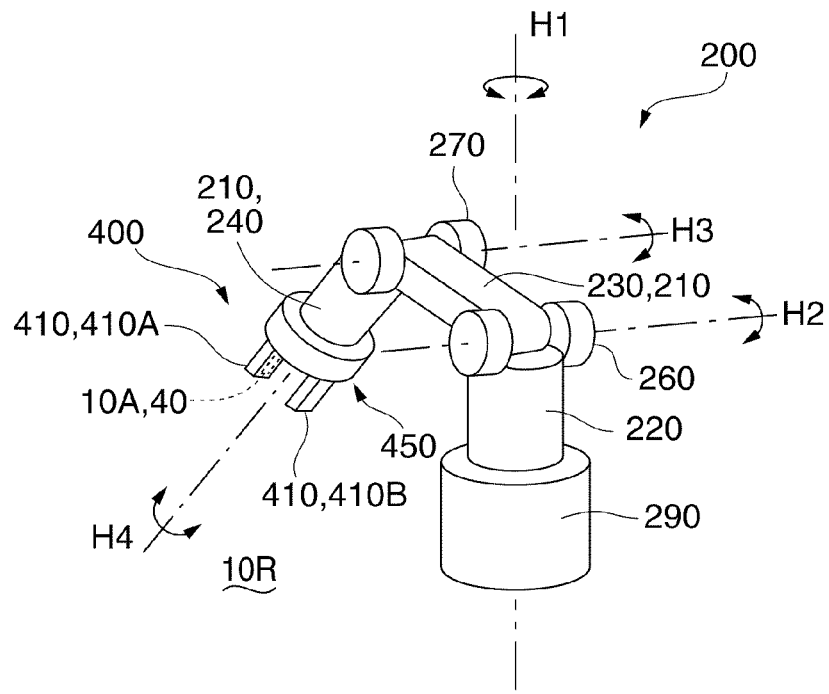
FIGS. 11A and 11B are explanatory views of a robot arm in which the optical position detecting device related to Embodiment 1 of the invention is provided in a hand unit.
Figure 11B:
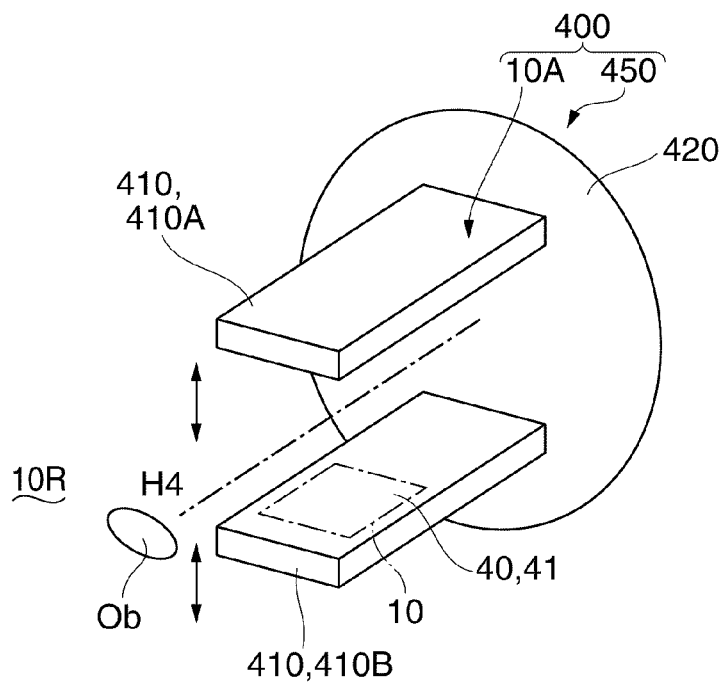

A robot hand unit using the optical position detecting device 10A related to Embodiment 1 of the invention as a tactile sensor device will be described with reference to FIGS. 11A and 11B. FIGS. 11A and 11B are explanatory views of a robot arm provided at the hand unit using the optical position detecting device 10A related to Embodiment 1 of the invention as a tactile sensor, and FIGS. 11A and 11B are an explanatory view of the overall robot arm, and an explanatory view of the hand unit.

The robot arm 200 shown in FIG. 11A is an apparatus which performs supply, extraction, or the like of workpieces or tools with respect to a numerically controlled machine tool, and includes a strut 220 erected from a base 290, and an arm 210. In the present embodiment, the arm 210 includes a first arm portion 230 coupled with a tip portion of the strut 220 via a first joint 260, and a second arm portion 240 coupled with a tip portion of the first arm portion 230 via a second joint 270. The strut 220 is rotatable around an axis H1 perpendicular to the base 290, the first arm portion 230 is rotatable around a horizontal axis H2 by the first joint 260 at the tip portion of the strut 220, and the second arm portion 240 is rotatable around a horizontal axis H3 by the second joint 270 at the tip portion of the first arm portion 230. A hand 450 of the hand unit 400 is coupled with the tip portion of the second arm portion 240, and the hand 450 is rotatable around an axis H4 of the second arm portion 240.

As shown in FIG. 11B, the hand unit 400 has the hand 450 including a plurality of grip claws 410 (gripper), and the hand 450 includes a disk-shaped grip claw support 420 holding the roots of the plurality of grip claws 410. In the present embodiment, the hand 450 includes a first grip claw 410A and a second grip claw 410B as the plurality of grip claws 410. Both of the two grip claws 410 are movable in a direction in which the grip claws are separated from each other and in a direction in which the grip claws approach each other, as shown by an arrow H4.

In the robot arm 200 configured in this way, when the target object Ob is gripped, the two grip claws 410 move in the direction in which the grip claws approach each other, thereby gripping the target object Ob after the strut 220, the first arm portion 230, and the second arm portion 240 rotate in a predetermined direction to make the hand 450 approach the target object Ob (workpiece).

Here, the inner surface of each grip claw 410 which comes in contact with the target object Ob when the target object Ob (workpiece) is gripped includes the first surface of the translucent member 40 of the optical position detecting device 10A described in the above embodiment. Accordingly, when the grip claws 410 grip the target object Ob, the optical position detecting device 10A detects the relative position or position of the target object Ob and the grip claw 410, and this detection result is fed back to a driving controller of the grip claws 410. Therefore, the grip claws 410 can be made to approach the target object Ob at high speed, and an increase in the speed of a workpiece gripping operation can be realized.

What is claimed is:

1. An optical position detecting device comprising:
    a plurality of light source sections which emits detection light;
    a light detection section which receives the detection light reflected by a target object located in an emitting space of the detection light;
    a light source driving section which turns on first light source sections among the plurality of light source sections in a first period and turns on, in a second period, second light source sections different from the first light source sections turned on in the first period; and
    a position detecting section which detects a position of the target object based on a light-receiving result of the light detection section in the first period and the second period,
    wherein each of the light source sections includes a plurality of light-emitting elements arrayed in a direction intersecting a direction of the optical axis of the detection light.

2. The optical position detecting device according to claim 1,
    wherein the light source driving section executes a first mode where the first light-emitting elements are turned on and a second mode where the second light-emitting elements are turned on.

3. The optical position detecting device according to claim 2,
    wherein the light source driving section turns on the first light-emitting elements in the first mode, and simultaneously turns on, in the second mode, the first light-emitting elements and the second light-emitting elements, thereby extending the emitting space in a direction in which the light-emitting elements are arrayed.

4. The optical position detecting device according to claim 3,
    wherein the light source driving section turns on one light-emitting element in the first mode, and simultaneously turns on, in the second mode, two or more light-emitting elements including the one light-emitting element turned on in the first mode.

5. The optical position detecting device according to claim 3,
    wherein all of the plurality of light source sections emit the detection light in the same direction.

6. The optical position detecting device according to claim 5,
    wherein, as seen from the emitting space, the light detection section is arranged at a position surrounded by the plurality of light source sections, and the plurality of light-emitting elements is linearly arrayed toward a direction separated from a position near the light detection section in the light source sections, and wherein first light-emitting elements are turned on in the first mode;

second light-emitting elements are not turned on in the first mode but are turned on in the second mode; and the first light-emitting elements are located at a position closer to the light detection section than the second light-emitting elements.

7. The optical position detecting device according to claim 5, wherein, as seen from the emitting side of the detection light, the plurality of light-emitting elements in the light source sections is linearly arrayed toward an outside from an inside of the emitting space, and first light-emitting elements are turned on in the first mode;

second light-emitting elements are not turned on in the first mode but are turned on in the second mode; and the first light-emitting elements are located further inside the emitting space than the second light-emitting elements.

8. The optical position detecting device according to claim 3, wherein second light-emitting elements that are in a turned off state in the first mode have a larger light-emitting intensity of the detection light than first light-emitting elements that are in a turned on state in the first mode.

9. The optical position detecting device according to claim 2, wherein the plurality of light source sections includes opposing light source sections which emit the detection light in directions opposite to each other on both sides between which the emitting space is pinched.

10. The optical position detecting device according to claim 1, wherein the position detecting section detects a coordinate position of the target object based on a result obtained by differentially moving first light sources and second light sources of the plurality of light source sections based on the light-receiving result of the light detection section.

11. The optical position detecting device according to claim 1, further comprising:

a reference light source section which emits reference light which enters the light detection section without travelling through the emitting space, wherein the position detecting section detects coordinates of the target object based on a result obtained by changing and differentially moving combinations of some light source sections of the plurality of light source sections and the reference light source section, based on the light-receiving result of the light detection section.

12. A robot hand comprising:

a plurality of grip claws which selectively grip a target object;

a grip claw support which holds the plurality of grip claws;

a plurality of light source sections which emits detection light;

a light detection section which receives the detection light reflected by the target object located in an emitting space of the detection light;

a light source driving section which turns on first light source sections among the plurality of light source sections in a first period and turns on, in a second period, second light source sections different from the first light source sections turned on in the first period; and a position detecting section which detects a position of the target object based on a light-receiving result of the light detection section in the first period and the second period, wherein each of the light source sections includes a plurality of light-emitting elements arrayed in a direction intersecting a direction of the optical axis of the detection light.

13. A robot arm comprising:

a plurality of grip claws which selectively grip a target object;

a grip claw support which holds the plurality of grip claws;

an arm portion connected to the grip claw support;

a strut to which the arm portion is connected;

a plurality of light source sections which emits detection light;

a light detection section which receives the detection light reflected by the target object located in an emitting space of the detection light;

a light source driving section which turns on first light source sections among the plurality of light source sections in a first period and turns on, in a second period, second light source sections different from the first light source sections turned on in the first period; and a position detecting section which detects a position of the target object based on a light-receiving result of the light detection section in the first period and the second period, wherein each of the light source sections includes a plurality of light-emitting elements arrayed in a direction intersecting a direction of the optical axis of the detection light.

* * * * *